(12) United States Patent
Reasoner

(10) Patent No.: US 12,392,736 B2
(45) Date of Patent: Aug. 19, 2025

(54) METHOD AND SYSTEM FOR INSPECTING AND MEASURING INSTALLED ONE-SIDED FASTENERS IN A STRUCTURE

(71) Applicant: The Boeing Company, Arlington, VA (US)

(72) Inventor: Nicholas C. Reasoner, Seattle, WA (US)

(73) Assignee: The Boeing Company, Arlington, VA (US)

( * ) Notice: Subject to any disclaimer, the term of this patent is extended or adjusted under 35 U.S.C. 154(b) by 288 days.

(21) Appl. No.: 18/177,003

(22) Filed: Mar. 1, 2023

(65) Prior Publication Data

US 2024/0295508 A1 Sep. 5, 2024

(51) Int. Cl.
*G01N 23/046* (2018.01)

(52) U.S. Cl.
CPC ... *G01N 23/046* (2013.01); *G01N 2223/1016* (2013.01); *G01N 2223/631* (2013.01); *G01N 2223/646* (2013.01)

(58) Field of Classification Search
CPC ............ G01N 23/046; G01N 23/203; G01N 2223/1016; G01N 2223/631; G01N 2223/646; G01N 23/04; G01N 2223/33; G01N 2223/321; G01N 2223/401; G01N 2223/32; G01N 2223/60; G01N 23/083; G01N 2223/628; G01N 2223/3303; G01N 2223/301; G01N 23/22; G01N 37/005; G01N 23/18; G01N 23/16; G01N 27/82; G01N 27/83; G01N 2223/629; G01N 2223/053; G01N 2223/3037; G01N 23/041; G01N 21/8851; G01N 21/9515;
(Continued)

(56) References Cited

U.S. PATENT DOCUMENTS 8,033,724 B2 10/2011 Edwards et al.
8,542,876 B1 9/2013 Engel et al.
(Continued)

FOREIGN PATENT DOCUMENTS

WO 2021130063 A1 7/2021

OTHER PUBLICATIONS

Extended European Search Report (EESR), European Patent Office, May 22, 2024, for Application No. EP24150280.6, Applicant the Boeing Company, 8 pages.

*Primary Examiner* — Irakli Kiknadze

(57) ABSTRACT

There is provided a method for inspecting and measuring one or more installed one-sided fasteners in a structure. The method includes positioning an X-ray imaging system at a first side of the structure at a location of the one or more installed one-sided fasteners. The method further includes emitting X-rays at the first side of the structure, detecting backscatter from the one or more installed one-sided fasteners, and generating image data from the X-ray imaging system in response to detecting the backscatter. The method further includes measuring and analyzing the image data, with an image processing system, to obtain one or more measurements of one or more dimensions of the one or more installed one-sided fasteners. The method further includes using the image data to inspect the one or more installed one-sided fasteners, and to detect any inconsistencies in the one or more measurements of the one or more dimensions.

20 Claims, 12 Drawing Sheets

(58) Field of Classification Search
CPC .... G01N 21/88; G01N 21/952; G01N 23/005;
G01N 2223/3301; G01N 2223/063; G01N
9/24; G01N 9/36; G06T 7/0004; G06T
7/593; G06T 2207/30164; G06T
2207/10116; G06T 7/001; G06T 7/13;
G06T 2207/30108; G06T 7/246; B25J
11/00; B25J 9/0084; B25J 19/023; G01B
11/272; G01B 15/04; G01B 11/24; G01B
15/00; G01B 11/26; G01B 21/22; G05D
1/0094; B64U 2101/30; B64U 2201/20;
B64U 2101/26; B64U 2201/10; G01V
5/20; G01V 5/26; B64D 45/00; B61L
23/042; B61L 23/045; G01T 1/169; G01T
1/167; G01T 1/16; B61K 9/10; G01M
5/0033; G01M 5/0083; G01M 5/0025;
G01M 5/0091; G01M 5/0075; G21K
1/04; G21K 5/04; G01K 1/02
USPC ............................. 378/4, 57, 62, 70, 86–90
See application file for complete search history.

(56) References Cited

U.S. PATENT DOCUMENTS

| | | | |
|---|---|---|---|
| 8,879,688 | B2 | 11/2014 | Safai |
| 8,923,481 | B2 | 12/2014 | Schubert et al. |
| 9,123,450 | B2 | 9/2015 | Liesenfelt et al. |
| 9,689,813 | B2 | 6/2017 | Lou et al. |
| 10,162,317 | B2 | 12/2018 | Toh |
| 10,859,719 | B2 | 12/2020 | Safai |
| 2013/0101090 | A1 | 4/2013 | Schubert et al. |
| 2013/0202090 | A1* | 8/2013 | Belcher .................... B61K 9/10 378/89 |
| 2016/0252468 | A1 | 9/2016 | Lou et al. |
| 2020/0200713 | A1 | 6/2020 | Hafenrichter et al. |
| 2021/0063323 | A1 | 3/2021 | Nakatani et al. |
| 2021/0396842 | A1 | 12/2021 | Li et al. |
| 2022/0214290 | A1* | 7/2022 | Maeder ................. G06T 7/0004 |

* cited by examiner

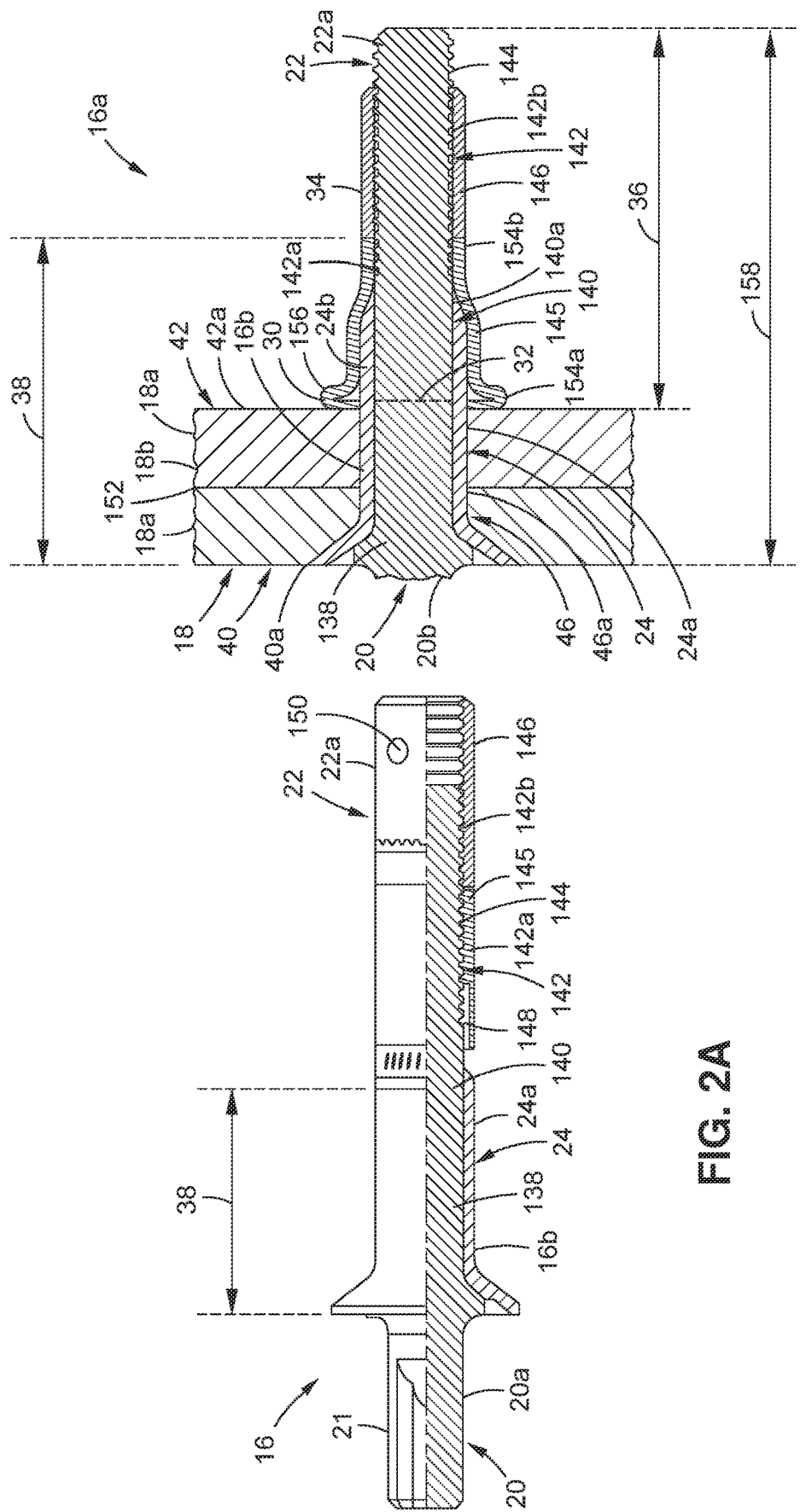

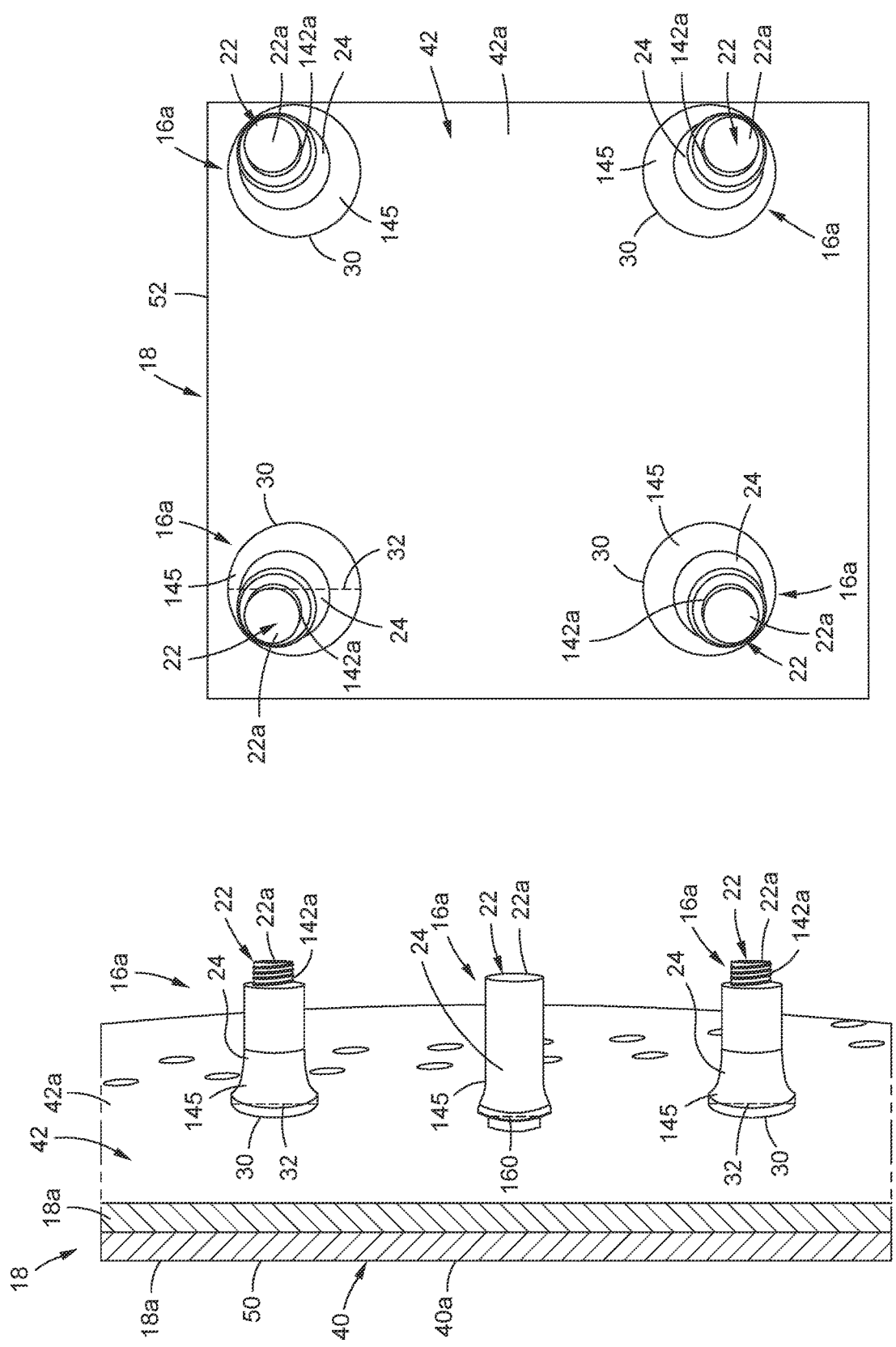

METHOD AND SYSTEM FOR INSPECTING AND MEASURING INSTALLED ONE-SIDED FASTENERS IN A STRUCTURE

FIELD

The present disclosure relates generally to X-ray inspection, and more particularly to systems and methods for X-ray inspection and measurement of installed one-sided fasteners in a structure.

BACKGROUND

One-sided fasteners, also referred to as "blind fasteners", are mechanical fasteners used to typically join two or more structural members together, where the one-sided fastener is only readily accessible at an exterior end on an exterior side of the joined structural members, and is not readily accessible at an interior end protruding from an interior side of the joined structural members, and the interior end is not visible, or is "blind". One-sided fasteners may be used in the manufacture of aircraft, spacecraft, rotorcraft, watercraft, automobiles, trains, architectural structures, and other vehicles or structures. The one-sided fasteners may be installed in confined spaces, for example, an aircraft fuel tank.

One known system and method used to inspect the installation of one-sided fasteners, or blind fasteners, involves inserting a device, such as a borescope, a camera probe, or a vision system, into an adjacent fastener hole to view an adjacent feature or an adjacent fastener requiring inspection and/or measurement. A borescope is an optical instrument designed to assist visual inspection of difficult to access cavities or areas and comprises a rigid or flexible tube with an eyepiece or display at one end, an objective lens or camera at another end, and linked together by an optical or electrical system therebetween. However, a borescope is used to inspect one-sided fasteners through an adjacent hole and may only be able to view 50% of the one-sided fastener. Moreover, the borescope may be invasive to a part installation, may have focal length limitations, and may have hole size constraints.

Another known system and method used to inspect the installation of one-sided fasteners, or blind fasteners, involves a mechanic or inspector physically entering a confined space to view and/or measure the installation of the one-sided fasteners, to ensure there are no inconsistencies in, for example, formation of a fastener bulb of the one-sided fastener, length of a pin protrusion of the one-sided fastener, or a grip length of the one-sided fastener. However, such confined space entry may be time consuming, labor intensive, and create ergonomic issues. Such increased time and labor may result in increased costs of manufacturing and inspecting structures with the one-sided fasteners.

Accordingly, there is a need in the art for an improved system and method for inspecting and measuring installed one-sided fasteners from the exterior side of a structure with installed one-sided fasteners, that do not require the use of a borescope, a camera probe, or a vision system to insert into an adjacent fastener hole to inspect or measure the installed one-sided fasteners, that reduce or eliminate confined space entry work to inspect and measure installed one-sided fasteners, that save time, labor, and costs in inspection and measurement of installed one-sided fasteners, and that provide advantages over known systems and methods.

SUMMARY

Example implementations of the present disclosure provide for an improved system and method for inspecting and measuring installed one-sided fasteners. As discussed in the below detailed description, versions of the improved system and method may provide significant advantages over known systems and methods.

In a version of the disclosure, there is provided a method for inspecting and measuring one or more installed one-sided fasteners in a structure. The method comprises the step of positioning an X-ray imaging system directed at a first side of the structure at a location of the one or more installed one-sided fasteners installed through one or more openings in the structure. The one or more installed one-sided fasteners each has a fastener body protruding from a second side of the structure.

The method further comprises the step of emitting X-rays at the first side of the structure at the location of the one or more installed one-sided fasteners. The method further comprises the step of detecting backscatter from the one or more installed one-sided fasteners. The method further comprises the step of generating image data from the X-ray imaging system, in real time, in response to detecting the backscatter. The image data comprises one or more images of the fastener body of the one or more installed one-sided fasteners.

The method further comprises the step of measuring and analyzing the image data, with an image processing system, to obtain one or more measurements of one or more dimensions of the one or more installed one-sided fasteners. The method further comprises the step of using the image data to inspect the one or more installed one-sided fasteners, and to detect any inconsistencies in the one or more measurements of the one or more dimensions of the one or more installed one-sided fasteners.

In another version of the disclosure, there is provided a method for inspecting and measuring one or more installed one-sided fasteners in an aircraft structure. The method comprises the step of positioning an X-ray imaging system directed at a first side of the aircraft structure at a location of the one or more installed one-sided fasteners installed through one or more openings in the aircraft structure. The one or more installed one-sided fasteners each has a fastener body protruding from a second side of the aircraft structure.

The method further comprises the step of emitting X-rays at the first side of the aircraft structure at the location of the one or more installed one-sided fasteners. The method further comprises the step of detecting backscatter from the one or more installed one-sided fasteners. The method further comprises the step of generating image data from the X-ray imaging system, in real time, in response to detecting the backscatter. The image data comprises one or more images of the fastener body of the one or more installed one-sided fasteners.

The method further comprises the step of measuring and analyzing the image data, with an image processing system, to obtain one or more measurements of one or more dimensions of the one or more installed one-sided fasteners. The one or more measurements comprise one or more of, a diameter of a fastener bulb of the one or more installed one-sided fasteners, a length of a pin protrusion of the one or more installed one-sided fasteners, and a grip length of the one or more installed one-sided fasteners. The method further comprises the step of using the image data to inspect the one or more installed one-sided fasteners, and to detect any inconsistencies in the one or more measurements of the one or more dimensions of the one or more installed one-sided fasteners.

In another version of the disclosure, there is provided a system for inspecting and measuring one or more installed one-sided fasteners in a structure. The system comprises the structure having a first side and a second side. The system further comprises one or more one-sided fasteners installed through one or more openings in the structure. The one or more installed one-sided fasteners each has a fastener body protruding from the second side of the structure.

The system further comprises an X-ray imaging system configured to emit X-rays at the first side of the structure at the location of the one or more installed one-sided fasteners, and configured to detect backscatter from the one or more installed one-sided fasteners. The system further comprises image data generated from the X-ray imaging system in response to detecting the backscatter. The image data comprises one or more images of the fastener body of the one or more installed one-sided fasteners.

The system further comprises an image processing system to measure and analyze the image data, to obtain one or more measurements of one or more dimensions of the one or more installed one-sided fasteners, to inspect the one or more installed one-sided fasteners, and to detect any inconsistencies in the one or more measurements of the one or more dimensions of the one or more installed one-sided fasteners.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2A is an illustration of a partial sectional top view of an exemplary one-sided fastener that may be used in a version of a system and a method of the disclosure;

FIG. 2B is an illustration of a cross-sectional top view of the one-sided fastener of FIG. 2A installed in a structure;

FIG. 2C is an illustration of a perspective side view of exemplary installed one-sided fasteners installed in a structure;

FIG. 2D is an illustration of a perspective back view of exemplary installed one-sided fasteners installed in a structure;

Figure 1:
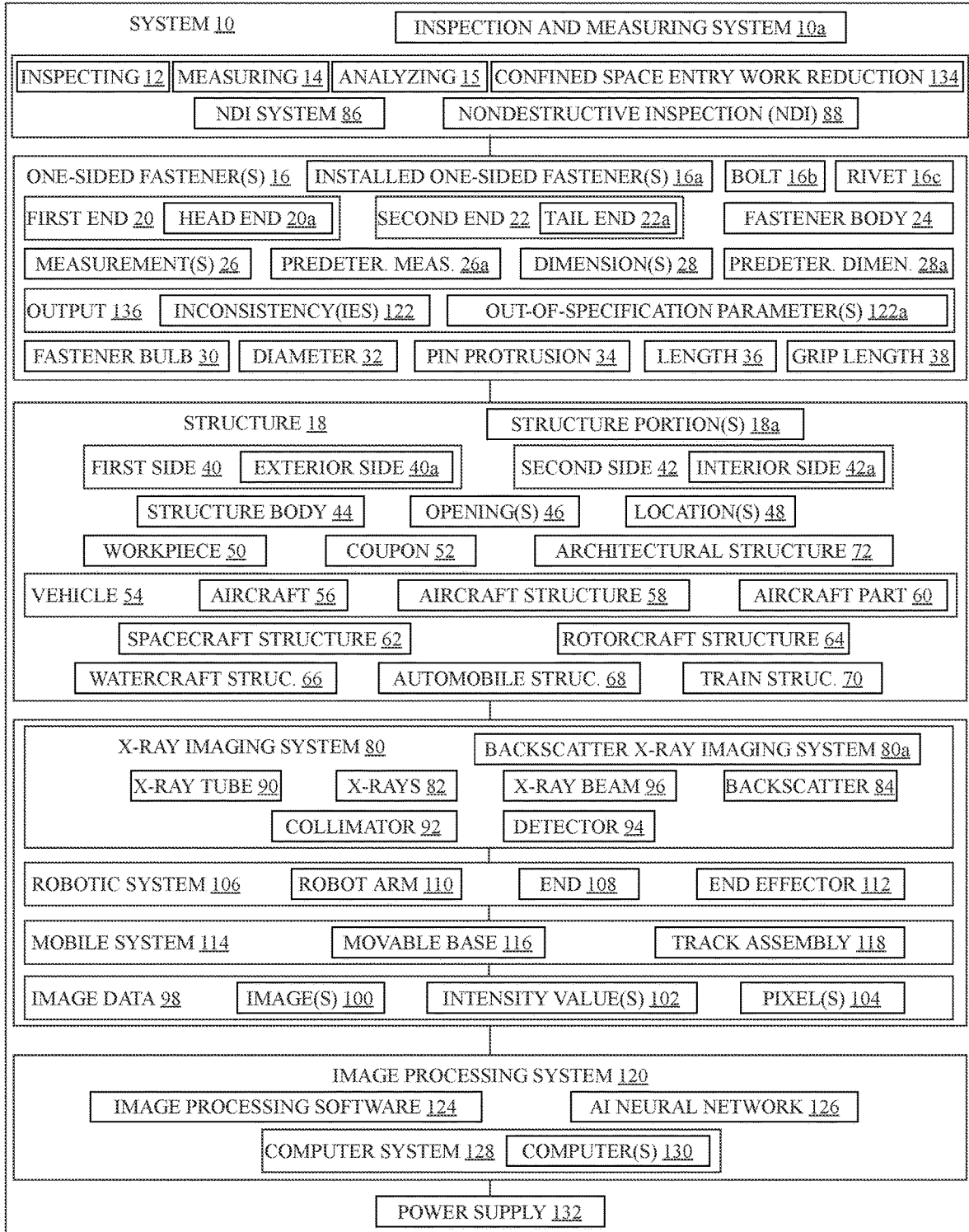
FIG. 1 is an illustration of a block diagram of an exemplary system of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary system 10, such as an inspection and measuring system 10a, for inspecting 12 and measuring 14 one or more installed one-sided fasteners 16a in a structure 18. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the system 10 in FIG. 1 are not meant to imply physical or architectural limitations to the manner in which an illustrative example may be implemented. Other components in addition to, or in place of, the ones illustrated may be used. Some components may be unnecessary. As shown in FIG. 1, the system 10 comprises one or more one-sided fasteners 16, such as one or more installed one-sided fasteners 16a. As used herein, "one-sided fastener" 16, also referred to as "blind fastener", means a mechanical fastener typically joining two or more structural members together, where the mechanical fastener is only readily accessible on a first exterior end of the mechanical fastener on an exterior side of the joined structural members, and a second interior end of the mechanical fastener protruding from an interior side of the joined structural members is not visible, is "blind", and is not readily accessible from the interior side of the joined structural members.

As shown in FIG. 1, each one-sided fastener 16, such as each installed one-sided fastener 16a, has a first end 20, such as a head end 20a, a second end 22, such as a tail end 22a, and a fastener body 24, such as a shaft body 24a (see FIG. 2A), formed between the first end 20 and the second end 22. As shown in FIG. 1, the one-sided fastener 16 may comprise a bolt 16b, a rivet 16c, or another suitable one-sided fastener 16. An exemplary one-sided fastener 16 is discussed in further detail below with respect to FIG. 2A. An exemplary installed one-sided fastener 16a is discussed in further detail below with respect to FIG. 2B.

As further shown in FIG. 1, the system 10 is used to obtain one or more measurements 26 of one or more dimensions 28 of the one or more installed one-sided fasteners 16a. As further shown in FIG. 1, the one or more measurements 26 of the one or more dimensions 28 of the one or more installed one-sided fasteners 16a comprise one or more of, a dimension 28 of a fastener bulb 30, such as a diameter 32 of the fastener bulb 30 of the one or more installed one-sided fasteners 16a, a dimension 28 of a pin protrusion 34, such as a length 36 of the pin protrusion 34 of the one or more installed one-sided fasteners 16a, a dimension 28 such as a grip length 38 of the one or more installed one-sided fasteners 16a, or another suitable measurement of another suitable dimension of the installed one-sided fastener 16a.

As used herein, "fastener bulb" means when a fastener is installed in a structure, a sleeve of the fastener is compressed, causing it to fold outwards to form a bulb configuration which is formed against an interior side of the structure. As used herein, "pin protrusion" means a length or a height that a fastener protrudes beyond a bearing surface, such as extending beyond an interior side of a structure the fastener is installed through. As used herein "grip length" means a length of an unthreaded portion, or a shank, of a fastener, such as a bolt or rivet.

Figure 4:
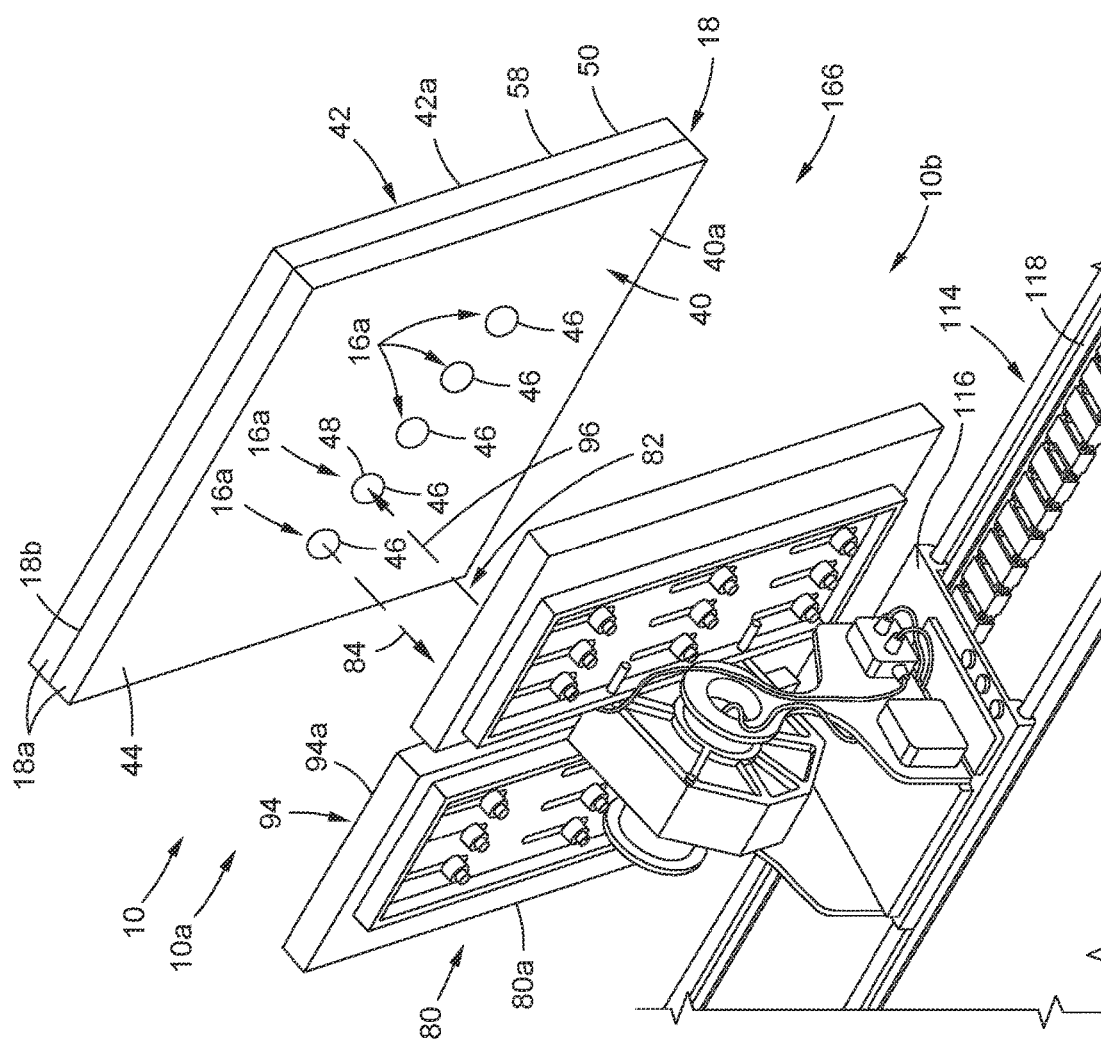
FIG. 4 is an illustration of a front perspective view of an exemplary version of a system disclosed herein used in an inspection environment.
Figure 5:
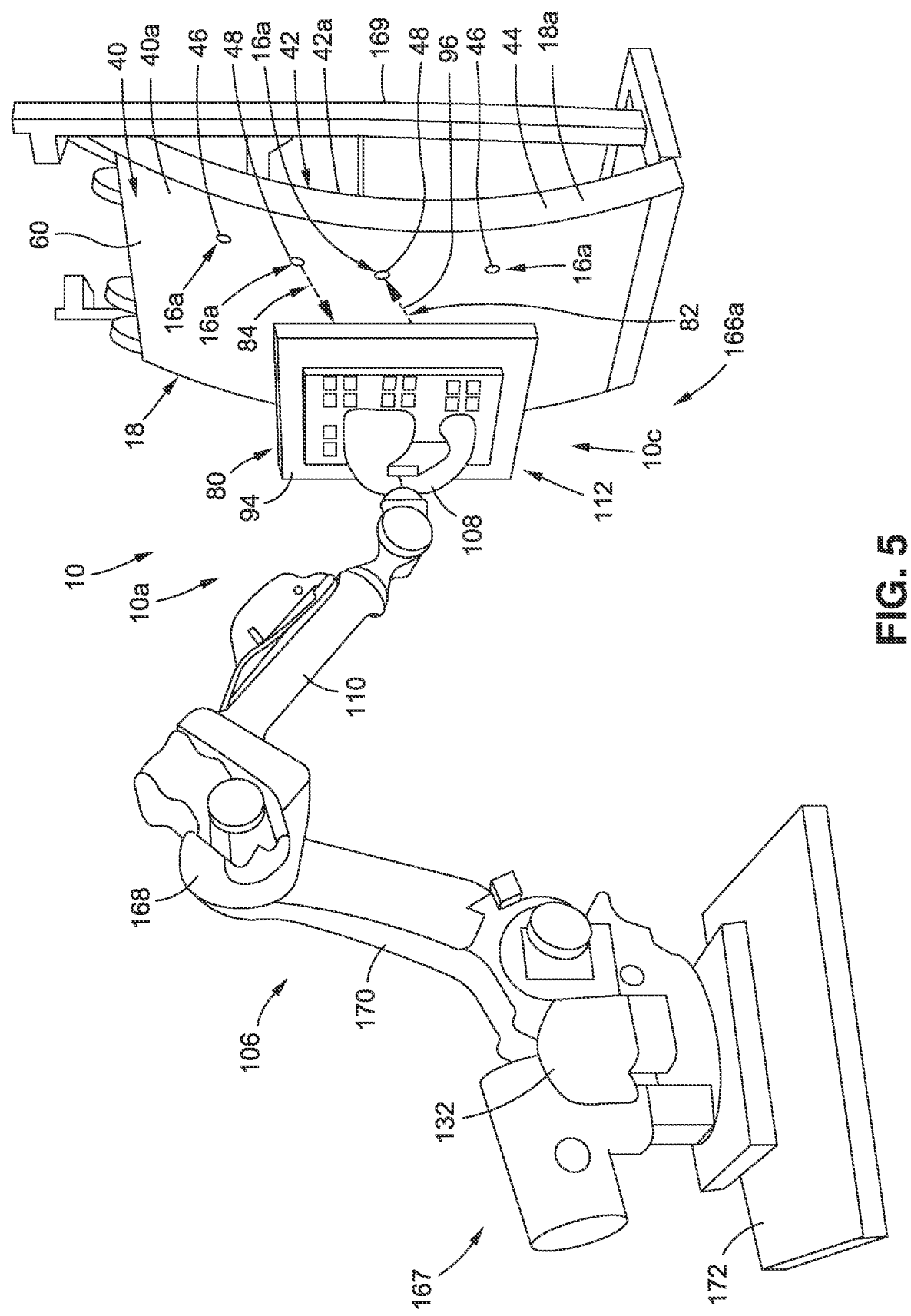
FIG. 5 is an illustration of a front perspective view of another exemplary version of a system disclosed herein used in an inspection environment.

As shown in FIG. 1, the system 10 further comprises the structure 18. In one version, the structure 18 comprises two structure portions 18a (see FIGS. 1, 2B, 4) joined together to form a joined structure 18b (see FIGS. 2B, 4). In another version, as shown in FIG. 5, the structure 18 comprises one structure portion 18a. As shown in FIG. 1, the structure 18 has a first side 40, such as an exterior side 40a, a second side 42, such as an interior side 42a, and a structure body 44 formed between the first side 40 and the second side 42. As shown in FIGS. 2B, 4, the structure body 44 comprises the two structure portions 18a forming the joined structure 18b. The structure 18 has one or more openings 46 (see FIGS. 1, 2B, 4), such as one or more through openings 46a (see FIGS. 2B, 4), that are drilled, or formed, through the structure 18. The one or more openings 46 are of a suitable size and dimension to receive the one or more one-sided fasteners 16. The one or more one-sided fasteners 16 are installed in the one or more openings 46 in the structure 18. The fastener body 24, or a portion of the fastener body 24, and the second end 22 of each one sided-fastener 16, such as each installed one-sided fastener 16a, protrude from the second side 42 of the structure 18 when installed in the structure 18. The one or more installed one-sided fasteners 16a have one or more locations 48 (see FIG. 1) of installation in the structure 18.

As shown in FIG. 1, the structure 18 may comprise a workpiece 50 or a coupon 52. As used herein, "workpiece" means an object, such as a piece of raw material, that is worked on with a tool or machine and that is in the process of being formed into a part or component. As used herein, "coupon", also referred to as "test coupon", means an object similar to a part to be manufactured and subject to the same manufacturing processes as the part and typically used to test qualities for quality assurance, and an example of a coupon may be a laminated composite test coupon.

As shown in FIG. 1, the structure 18 may be a structure 18, such as a workpiece 50, of a vehicle 54, such as an aircraft 56, for example, an aircraft structure 58 or an aircraft part 60. As shown in FIG. 1, the structure 18 may also be part of another vehicle 54, for example, a spacecraft structure 62 of a spacecraft, a rotorcraft structure 64 of a rotorcraft, a watercraft structure (STRUC.) 66 of a watercraft, an automobile structure (STRUC.) 68 of an automobile, a train structure (STRUC.) 70 of a train, or another suitable vehicle structure. As further shown in FIG. 1, the structure 18 may also be an architectural structure 72.

In these illustrative examples, the system 10 is used to inspect the structure 18, such as the workpiece 50, the coupon 52, the aircraft structure 58, the aircraft part 60, or the other suitable structures. The structure 18 may be selected from any number of different types of objects. For example, without limitation, the structure 18 may take the form of a mobile platform, a stationary platform, an air-based structure, a land-based structure, an aquatic-based structure, a space-based structure, or some other suitable type of structure. More specifically, the structure 18 may be the vehicle 54 or the architectural structure 72. In some cases, the structure 18 may be a part in another object, for example, with the aircraft structure 58 or aircraft part 60 of an aircraft 56, a section of a fuselage 74 (see FIG. 9) for the aircraft 56, a wing 76 (see FIG. 9) for the aircraft 56, or a tail 78 (see FIG. 9) for the aircraft 56. In other cases, the structure 18 may be a part in another object, for example, with the architectural structure 72, a building wall, a door, or a panel, a structural support on a bridge, or some other suitable type of part.

As shown in FIG. 1, the system 10 further comprises an X-ray imaging system 80 configured to emit X-rays 82 directed at the first side 40 of the structure 18 at the one or more locations 48 of the one or more installed one-sided fasteners 16a. The X-ray imaging system 80 is further configured to detect backscatter 84 from the one or more installed one-sided fasteners 16a. Preferably, the X-ray imaging system 80 comprises a backscatter X-ray imaging system 80a (see FIG. 1). However, the X-ray imaging system 80 may comprise another suitable X-ray imaging system. The system 10 with the X-ray imaging system 80 comprising the backscatter X-ray imaging system 80a is an example of a nondestructive inspection (NDI) system 86 (see FIG. 1) that uses X-rays 82 to inspect an object, in this case, the installed one-sided fasteners 16a, to perform nondestructive inspection (NDI) 88 (see FIG. 1), without causing any undesired effects to the structure 18 or the one or more installed one-sided fasteners 16a. The backscatter X-ray imaging system 80a detects radiation or backscatter 84 that reflects from a target, such as the fastener body 24 of the one or more installed one-sided fasteners 16a.

As shown in FIG. 1, in one illustrative example, the backscatter X-ray imaging system 80a may include an X-ray tube 90, a collimator 92, and a detector 94. The X-ray tube 90 generates and emits the X-rays 82 (see FIG. 1). The collimator 92 filters the X-rays 82 to form an X-ray beam 96 (see FIG. 1) using a portion of the X-rays 82 that travel substantially parallel to a specified direction. When the X-rays 82, such as the X-ray beam 96, encounters the one or more installed one-sided fasteners 16a, some or all of the X-rays 82 in the X-ray beam 96 are scattered by the one or more installed one-sided fasteners 16a. In particular, the X-rays 82 may be scattered off of a surface of the one or more installed one-sided fasteners 16a and/or a subsurface of the one or more installed one-sided fasteners 16a. The scattered X-rays are referred to as the backscatter 84 (see FIG. 1). The detector 94 detects some or all of the backscatter 84. The backscatter 84 that is detected may be used to generate image data 98 (see FIG. 1) for the one or more installed one-sided fasteners 16a that can be used to form one or more images 100 of the one or more installed one-sided fasteners 16a. For example, the backscatter 84 that is detected when the X-rays 82 in the X-ray beam 96 are directed at the one or more locations 48 of the one or more installed one-sided fasteners 16a and are directed at one or more portions of the one or more installed one-sided fasteners 16a may be used to generate an intensity value 102 (see FIG. 1) for a pixel 104 (see FIG. 1) in the image 100 that corresponds to the one or more locations 48 and the one or more portions of the one or more installed one-sided fasteners 16a. The intensity values 102 for the pixels 104 in the image 100 may determine the level of contrast in the image 100 and the level of detail in the image 100. Further, the amount of backscatter 84 detected by the detector 94 determines the intensity value 102 for the pixel 104 of the image 100.

In one version, the detector 94 may have a shape that may be changed to substantially conform to a shape of a surface of the structure 18 being inspected, for example, a curved surface or a flat surface, of the structure 18, such as the first side 40 of the structure 18. For example, in one version, the detector 94 may comprise a plurality of sensor arrays with a plurality of sensors configured to detect the backscatter 84 formed in response to the X-ray beam 96 encountering the one or more installed one-sided fasteners 16a.

The X-ray imaging system 80 may be supported on various structures and positioned with respect to the structure 18 with the one or more installed one-sided fasteners 16a in various ways. As shown in FIG. 1, in one version, the X-ray imaging system 80 is attached, or coupled, to a robotic system 106, and in particular, is attached, or coupled, at an end 108 of a robot arm 110 of the robotic system 106. The X-ray imaging system 80 may be considered to be an end effector 112 (see FIG. 1).

As shown in FIG. 1, in another version, the X-ray imaging system 80 is attached, or coupled, to a mobile system 114. The mobile system 114 comprises a movable base 116 (see FIG. 1) configured to move along a track assembly 118 (see FIG. 1), or another suitable structure. In particular, the X-ray imaging system 80 is attached, or coupled, to the movable base 116 of the mobile system 114.

As shown in FIG. 1, the system 10 further comprises the image data 98 generated from the X-ray imaging system 80 in response to detecting the backscatter 84. The image data 98 comprises the one or more images 100 (see FIG. 1) of the one or more installed one-sided fasteners 16a, and in particular, one or more images 100 of the fastener body 24 of the one or more installed one-sided fasteners 16a.

As shown in FIG. 1, the system 10 further comprises an image processing system 120 to measure and analyze the image data 98, to obtain the one or more measurements 26 of the one or more dimensions 28 of the one or more installed one-sided fasteners 16a, to inspect the one or more installed one-sided fasteners 16a, and to detect any inconsistencies 122 in the one or more measurements 26 of the one or more dimensions 28 of the one or more installed one-sided fasteners 16a. As shown in FIG. 1, the image processing system 120 comprises one of, an image processing software 124, an artificial intelligence (AI) neural network 126, or another suitable image processing system.

As shown in FIG. 1, the image processing system 120 includes a computer system 128 having one or more computers 130 depending on the implementation. Depending on the implementation, the computer system 128 may be configured to control at least one of, the X-ray imaging system 80, the image processing system 120, the image processing software 124, the AI neural network 126, the robotic system 106, the mobile system 114, or other components of the system 10. For example, computer system 128 may send commands to the X-ray imaging system 80 to control the emission and positioning of the X-rays 82. The computer system 128, or a human operator, may use the one or more images 100 to identify any inconsistencies 122 in the measurements 26 of the dimensions 28 of the installed one-sided fasteners 16a.

As shown in FIG. 1, the system 10 further comprises at least one power supply 132 to provide or supply power to one or more components of the system 10, such as the X-ray imaging system 80, the image processing system 120, the image processing software 124, the AI neural network 126, the computer system 128, the computers 130, the robotic system 106, the mobile system 114, or other components of the system 10. The at least one power supply 132 may comprise an electrical power supply, a battery power supply, a solar power supply, or another suitable power supply or power source to provide power to the system 10.

Thus, an illustrative version of the system 10 provides an X-ray imaging system 80 that directs and emits X-rays 82 at one or more installed one-sided fasteners 16a installed in one or more openings 46 in the structure 18, and detects and receives backscatter 84 from the installed one-sided fasteners 16a. Image data 98 from the X-ray imaging system 80 is generated, in real time, in response to detecting, or receiving, the backscatter 84, where the image data may comprise one or more images 100 of the one or more installed one-sided fasteners 16a, for example, the fastener body 24 of each of the one or more installed one-sided fasteners 16a. The image data 98 is measured and analyzed with the image processing system 120, to obtain the one or more measurements 26 of the one or more dimensions 28, of the one or more installed one-sided fasteners 16a.

The system 10 uses the image data 98 generated from the X-ray imaging system 80 to inspect the one or more installed one-sided fasteners 16a, to detect any inconsistencies 122 in the one or more measurements 26 of the one or more dimensions 28 of the one or more installed one-sided fasteners 16a. This results in providing a confined space entry work reduction 134 (see FIG. 1), that is, a reduction in having an operator, a worker, a mechanic, an inspector, a robot, or another user or automated apparatus, perform confined space entry work in a confined space in, for example, an aircraft structure 58, such as a fuel tank of a wing 76 of an aircraft 56, by allowing for nondestructive inspection 88 of the one or more installed one-sided fasteners 16a.

An output 136 (see FIG. 1) of the one or more inconsistencies 122 (see FIG. 1), for example, one or more out-of-specification parameters 122a (see FIG. 1), in the measurements 26 of the dimensions 28 of the one or more installed one-sided fasteners 16a is generated if one of the following dimensions 28 is found to be inconsistent with a predetermined measurement (PREDETER. MEAS.) 26a (see FIG. 1) of a predetermined dimension (PREDETER. DIMEN.) 28a (see FIG. 1). The one or more measurements 26 of the one or more dimensions 28 being measured and analyzed include the diameter 32 of the fastener bulb 30 of the one or more installed one-sided fasteners 16a, the length 36 of the pin protrusion 34 of the one or more installed one-sided fasteners 16a, and the grip length 38 of the one or more installed one-sided fasteners 16a.

Now referring to FIGS. 2A-2B, FIG. 2A is an illustration of a partial sectional top view of an exemplary one-sided fastener 16 that may be used in a version of the system 10 (see FIG. 1) and the method 250 (see FIG. 8A), and the method 280 (see FIG. 8B), of the disclosure, and FIG. 2B is an illustration of a cross-sectional top view of the one-sided fastener 16 of FIG. 2A, installed in a structure 18, to form an installed one-sided fastener 16a.

As shown in FIG. 2A, the one-sided fastener 16 comprises a bolt 16b having the first end 20, or head end 20a with a head portion 21, the second end 22, or tail end 22a, and the fastener body 24, such as the shaft body 24a. FIG. 2A further shows a core fastener portion 138 having a shank 140 that is smooth and having a threaded portion 142 with threads 144. FIG. 2A further shows a sleeve 145 surrounding a first portion 142a of the threaded portion 142, and a nut 146 surrounding a second portion 142b of the threaded portion 142. FIG. 2A further shows an insert 148 and a thread locking feature 150. FIG. 2A further shows the grip length 38 of the one-sided fastener 16, such as the bolt 16b.

As shown in FIG. 2B, the installed one-sided fastener 16a, such as the bolt 16b, is installed in the structure 18 comprising two structure portions 18a that form a joined structure 18b with a joint 152, so that the one-sided fastener 16 of FIG. 2A is now in the form of the installed one-sided fastener 16a. The installed one-sided fastener 16a is installed in the opening 46, such as the through opening 46a, formed through the structure 18, such as through the two structure portions 18a. As shown in FIG. 2B, the installed one-sided fastener 16a, such as the bolt 16b, has the first end 20 comprising a break-off end 20b, where the head portion 21 (see FIG. 2A) of the head end 20a has been broken off at the first side 40, such as the exterior side 40a, of the structure 18, with the installation process. FIG. 2B further shows the installed one-sided fastener 16a with the second end 22, or tail end 22a, and the fastener body 24, such as the shaft body 24a. FIG. 2B further shows the core fastener portion 138 having the shank 140 and the threaded portion 142 with threads 144.

FIG. 2B further shows the sleeve 145 now compressed against the second side 42, or interior side 42a, of the structure 18, and surrounding a portion 24b of the fastener body 24, surrounding a portion 140a of the shank 140, and surrounding a first portion 142a of the threaded portion 142. As shown in FIG. 2B, with installation of the one-sided fastener 16 through the structure 18, the sleeve 145 has a first end 154a that compresses and forms the fastener bulb 30 adjacent the second side 42 of the structure 18, and sleeve 145 has a second end 154b adjacent the nut 146. As shown in FIG. 2B, the fastener bulb 30 has a diameter 32, and the sleeve 145 with the fastener bulb 30 has a bell-shaped profile 156. FIG. 2B further shows the nut 146 surrounding the second portion 142b of the threaded portion 142. FIG. 2B further shows a length 158 of the installed one-sided fastener 16a, the grip length 38 of the installed one-sided fastener 16a, and the length 36 of the pin protrusion 34 of the installed one-sided fastener 16a.

Now referring to FIG. 2C, FIG. 2C is an illustration of a perspective side view of three exemplary installed one-sided fasteners 16a installed in, and through, a structure 18 with two structure portions 18a. FIG. 2C shows the first side 40, or exterior side 40a, and the second side 42, or interior side 42a, of the structure 18 comprising a workpiece 50. FIG. 2C shows the installed one-sided fasteners 16a with the fastener body 24 and the second end 22, or tail end 22a, of the installed one-sided fasteners 16a protruding from the second side 42 of the structure 18. FIG. 2C shows two of the installed one-sided fasteners 16a each with the fastener bulb 30 formed by the sleeve 145 compressed against the second side 42 of the structure 18 and each with the threaded portion 142 at the second end 22. As shown in FIG. 2C, each of the fastener bulbs 30 formed has a diameter 32. FIG. 2C further shows one installed one-sided fastener 16a shown in the middle, where the sleeve 145 did not properly compress to form the fastener bulb 30 and the fastener bulb 30 did not form and the threaded portion 142 did not extend past the sleeve 145. As shown in FIG. 2C, the installed one-sided fastener 16a in the middle with no fastener bulb 30 has a diameter 160 that is less than the diameters 32 of the fastener bulbs 30 that are properly formed. The system 10 (see FIG. 1), the method 250 (see FIG. 8A), and the method 280 (see FIG. 8B) are designed to measure the diameter 32 of the fastener bulb 30 of the installed one-sided fasteners 16a, to obtain any inconsistencies 122, of the measurements 26 of the dimension 28 of the installed one-sided fastener 16a, such as shown in FIG. 2C, where the fastener bulb 30 does not form or does not form properly. The system 10 (see FIG. 1), the method 250 (see FIG. 8A), and the method 280 (see FIG. 8B) are designed to detect when the fastener bulb 30 is not properly formed, such as, for example, not formed at all, under formed, or another type of improper formation, by measuring an inconsistency 122, such as an out-of-specification parameter 122a (see FIG. 1), for example, an inconsistent or out-of-specification diameter, or an absence of a diameter.

Now referring to FIG. 2D, FIG. 2D is an illustration of a perspective back view of four exemplary installed one-sided fasteners 16a installed in a structure 18, such as a coupon 52. FIG. 2D shows four installed one-sided fasteners 16a installed in the structure 18. FIG. 2D shows the second side 42, or interior side 42a, of the structure 18 comprising the coupon 52. FIG. 2D shows the installed one-sided fasteners 16a with the fastener body 24 and the second end 22, or tail end 22a, of the installed one-sided fasteners 16a protruding from the second side 42 of the structure 18. FIG. 2D shows each of the four installed one-sided fasteners 16a with the fastener bulb 30 properly formed by the sleeve 145 compressed against the second side 42 of the structure 18 and each with the threaded portion 142 at the second end 22. FIG. 2D further shows the diameter 32 of one of the fastener bulbs 30.

Figure 3:
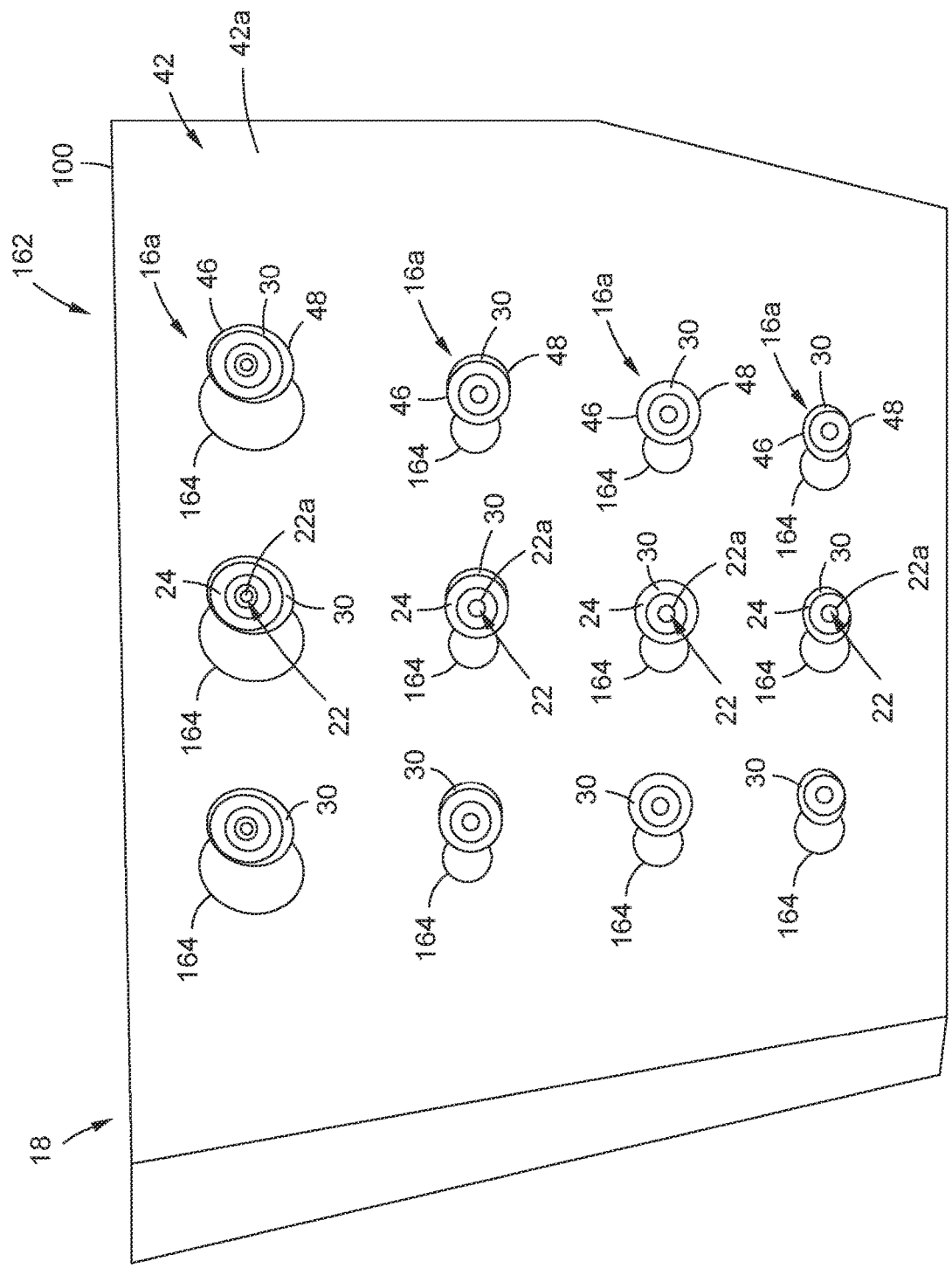
FIG. 3 is a schematic illustration of a perspective back view of an X-ray image scan of installed one-sided fasteners.

Now referring to FIG. 3, FIG. 3 is a schematic illustration of a perspective back view of an X-ray image scan 162 of the image 100 of installed one-sided fasteners 16a. The X-ray image scan 162 of the image 100 may be formed based on the backscatter 84 (see FIG. 1) received or detected by the X-ray imaging system 80 (see FIG. 1). As shown in FIG. 3, the X-ray image scan 162 of the image 100 shows the second side 42, or interior side 42a, of the structure 18, and shows locations 48 of the installed one-sided fasteners 16a installed in the structure 18 through openings 46. FIG. 3 shows the fastener body 24 and the second end 22, or tail end 22a, of the installed one-sided fasteners 16a protruding from the second side 42 of the structure 18. FIG. 3 further shows each of the installed one-sided fasteners 16a with the fastener bulb 30. FIG. 3 further shows ring portions 164 indicating shadows that may be visible in the X-ray image scan 162 of the image 100 but that do not affect the measurements 26 of the dimensions 28 of the installed one-sided fasteners 16a, including the diameter 32 of the fastener bulb 30, the length 36 of the pin protrusion 34, and the grip length 38.

Now referring to FIG. 4, FIG. 4 is an illustration of a front perspective view of an exemplary version of a system 10, such as an inspection and measuring system 10a, for example, a system 10b, used in an inspection environment 166 in accordance with an illustrative example. As shown in FIG. 4, the system 10 of the inspection environment 166 comprises installed one-sided fasteners 16a installed in a structure 18, such as a workpiece 50, for example, an aircraft structure 58. As shown in FIG. 4, the structure 18 comprises the first side 40, or exterior side 40a, the second side 42, or interior side 42a, and the structure body 44 comprising structure portions 18a joined together to form the joined structure 18b. The structure 18 has openings 46 (see FIG. 4) through which the installed one-sided fasteners 16a are inserted and fitted in. Although FIG. 4 shows five installed one-sided fasteners 16a, more than five installed one-sided fasteners 16a may be installed in the structure 18.

As further shown in FIG. 4, the system 10 in the inspection environment 166 comprises a version of the X-ray imaging system 80, such as a backscatter X-ray imaging system 80a, positioned on a movable base 116 of a mobile system 114, where the movable base 116 is coupled to, and moves along, the track assembly 118. The track assembly 118 may comprise a linear rail system that can be expanded to image different lengths of the structure 18 with the installed one-sided fasteners 16a. The mobile system 114 may be designed to work in different orientations with respect to the positioning to the structure 18 and the installed one-sided fasteners 16a.

As shown in FIG. 4, the X-ray imaging system 80 is directed at the first side 40 of the structure 18 at the location 48 of the installed one-sided fastener 16a installed through the opening 46 in the structure 18. As further shown in FIG. 4, the X-ray imaging system 80 comprises the detector 94, such as a scintillator detector 94a, that emits X-rays 82, such as an X-ray beam 96, at the first side 40 of the structure 18 and toward the location 48 of the installed one-sided fastener 16a. The X-rays 82 generated by the X-ray imaging system 80 may travel between the detector 94 and the structure 18. Backscatter 84 may result from the X-rays 82 reaching the installed one-sided fastener 16a, and the backscatter 84 is detected from the installed one-sided fastener 16a installed in the structure 18 and received by the detector 94 of the X-ray imaging system 80. The X-ray imaging system 80 generates image data 98 (see FIG. 1), in real time, in response to detecting, or receiving, the backscatter 84, and the image data 98 generated from the backscatter 84 may be measured and analyzed with the image processing system 120 (see FIG. 1) to obtain one or more measurements 26 (see FIG. 1) of one or more dimensions 28 (see FIG. 1) of the one or more installed one-sided fasteners 16a. The image data 98 may be used to detect any inconsistencies 122 (see FIG. 1) in the one or more measurements 26 of the one or more dimensions 28 of the one or more installed one-sided fasteners 16a.

Now referring to FIG. 5, FIG. 5 is an illustration of a front perspective view of another exemplary version of a system 10, such as inspection and measuring system 10a, for example, a system 10c, used in an inspection environment 166a and in a manufacturing environment 167 in accordance with an illustrative example. As shown in FIG. 5, the system 10 of the inspection environment 166a comprises installed one-sided fasteners 16a installed in a structure 18, such as an aircraft part 60, for example, a fuselage part. As shown in FIG. 5, the structure 18 comprises the first side 40, or exterior side 40a, the second side 42, or interior side 42a, and the structure body 44 comprising a structure portion 18a. The structure 18 has openings 46 (see FIG. 5) through which the installed one-sided fasteners 16a are inserted and fitted in. As further shown in FIG. 5, the structure 18 is supported by a support structure 169.

As further shown in FIG. 5, the system 10 in the inspection environment 166a comprises a version of the X-ray imaging system 80 coupled to, and positioned at, the end 108 of a robot arm 110 of a robotic system 106, that is inspecting multiple exemplary installed one-sided fasteners 16a installed in the structure 18. As shown in FIG. 5, the robotic system 106 further comprises an elbow joint 168 connected to the robot arm 110, a shoulder 170 connected to the elbow joint 168, a base 172 connected to the shoulder 170, and a power supply 132 connected to the shoulder 170, for powering the robotic system 106. As shown in FIG. 5, the X-ray imaging system 80 acts as an end effector 112 of the robotic system 106. The robotic system 106 provides customized motion of the X-ray imaging system 80 with respect to the structure 18 and the installed one-sided fasteners 16a.

As shown in FIG. 5, the X-ray imaging system 80 is directed at the first side 40 of the structure 18 at the location 48 of the installed one-sided fastener 16a installed through the openings 46 in the structure 18. As further shown in FIG. 5, the X-ray imaging system 80 comprises the detector 94 that emits X-rays 82, such as an X-ray beam 96, at the first side 40 of the structure 18 and toward the location 48 of the installed one-sided fastener 16*a*. The X-rays 82 generated by the X-ray imaging system 80 may travel between the detector 94 and the structure 18. Backscatter 84 (see FIG. 5) results from the X-rays 82 reaching the installed one-sided fastener 16*a*, and the backscatter 84 is detected from the installed one-sided fastener 16*a* installed in the structure 18 and received by the detector 94 of the X-ray imaging system 80. The X-ray imaging system 80 generates image data 98 (see FIG. 1), in real time, in response to detecting, or receiving, the backscatter 84, and the image data 98 generated from the backscatter 84 may be measured and analyzed with the image processing system 120 (see FIG. 1) to obtain one or more measurements 26 (see FIG. 1) of one or more dimensions 28 (see FIG. 1) of the one or more installed one-sided fasteners 16*a*. The image data 98 may be used to detect any inconsistencies 122 (see FIG. 1) in the one or more measurements 26 of the one or more dimensions 28 of the one or more installed one-sided fasteners 16*a*.

Figure 6:
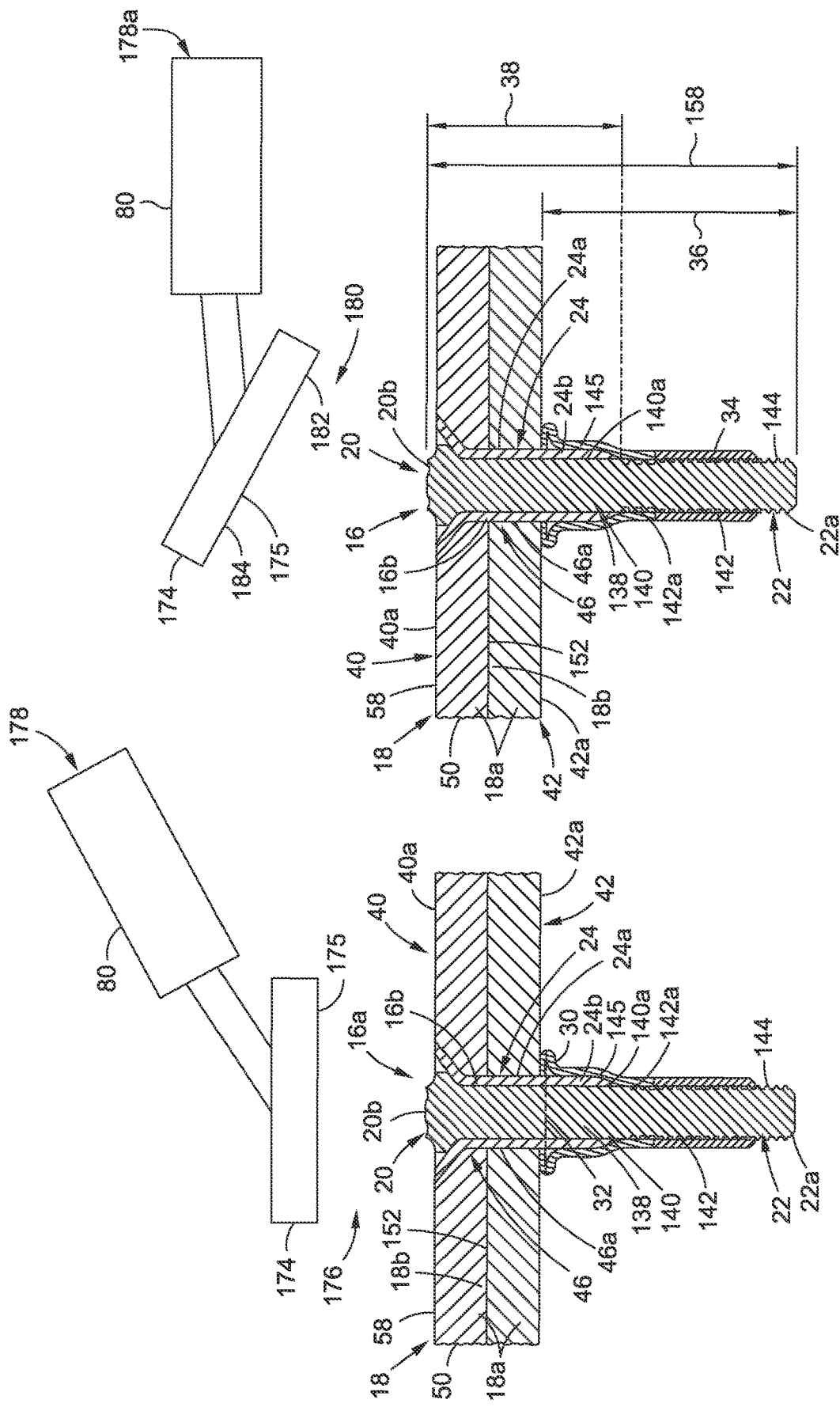
FIG. 6A is an illustration of a cross-sectional top view of an exemplary installed one-sided fastener installed in a structure, and an X-ray imaging system measuring a diameter of a fastener bulb.
FIG. 6B is an illustration of a cross-sectional top view of an exemplary installed one-sided fastener installed in a structure, and an X-ray imaging system measuring a length of a pin protrusion and a grip length.

Now referring to FIG. 6A, FIG. 6A is an illustration of a cross-sectional top view of an exemplary installed one-sided fastener 16*a*, such as a bolt 16*b*, installed in a structure 18, such as a workpiece 50, for example, an aircraft structure 58, and an X-ray device 174 of the X-ray imaging system 80 positioned in a parallel position 176 parallel to, and directly opposite, the installed one-sided fastener 16*a* and the first side 40 of the structure 18, to measure the diameter 32 of the fastener bulb 30 of the installed one-sided fastener 16*a*. The parallel position 176 may also be referred to as a top-down position of the X-ray device 174. As shown in FIG. 6A, in one version, the X-ray device 174 comprises an X-ray backscatter scanning head 175 to detect backscatter 84 (see FIG. 1) of the installed one-sided fastener 16*a*. In other versions, the X-ray device 174 may comprise a detector 94 (see FIG. 1), or another suitable device. As shown in FIG. 6A, the X-ray device 174 of the X-ray imaging system 80 is in the form of a portable handheld device 178. Alternatively, the X-ray device 174 and the X-ray imaging system 80 may be coupled to, and positioned at, the end 108 of a robot arm 110 of a robotic system 106, as shown in FIG. 5, or may be positioned on a movable base 116 of a mobile system 114, where the movable base 116 is coupled to, and moves along, the track assembly 118, as shown in FIG. 4.

As shown in FIG. 6A, the installed one-sided fastener 16*a*, such as the bolt 16*b*, is installed in the structure 18, such as the workpiece 50, for example, the aircraft structure 58, comprising two structure portions 18*a* that form the joined structure 18*b* with a joint 152. The installed one-sided fastener 16*a* is installed in the opening 46, such as the through opening 46*a*, formed through the structure 18, such as through the two structure portions 18*a*. As shown in FIG. 6A, the installed one-sided fastener 16*a*, such as the bolt 16*b*, has the first end 20 comprising the break-off end 20*b*, at the first side 40, such as the exterior side 40*a*, of the structure 18. FIG. 6A further shows the installed one-sided fastener 16*a* with the second end 22, or tail end 22*a*, and the fastener body 24, such as the shaft body 24*a*. FIG. 6A further shows the core fastener portion 138 having the shank 140 and the threaded portion 142 with threads 144.

FIG. 6A further shows the sleeve 145 compressed against the second side 42, or interior side 42*a*, of the structure 18, and surrounding the portion 24*b* of the fastener body 24, surrounding the portion 140*a* of the shank 140, and surrounding the first portion 142*a* of the threaded portion 142. FIG. 6A shows the fastener bulb 30 adjacent the second side 42 of the structure 18, and shows the diameter 32 of the fastener bulb 30 to be measured with the X-ray imaging system 80.

Now referring to FIG. 6B, FIG. 6B is an illustration of a cross-sectional top view of an exemplary installed one-sided fastener 16*a*, such as a bolt 16*b*, installed in the structure 18, such as the workpiece 50, for example, the aircraft structure 58, and the X-ray device 174 of the X-ray imaging system 80 positioned at an angled position 180 and an offset configuration 182 and directed at an offset angle 184 to the installed one-sided fastener 16*a* and the first side 40 of the structure 18, to measure the length 36 of the pin protrusion 34 of the installed one-sided fastener 16*a*, and to measure the grip length 38 of the installed one-sided fastener 16*a*. The offset angle 184 may vary, and in one version, may be a top-down position of the X-ray device 174. As shown in FIG. 6B, in one version, the X-ray device 174 comprises the X-ray backscatter scanning head 175 to detect backscatter 84 of the installed one-sided fastener 16*a*. In other versions, the X-ray device 174 may comprise the detector 94 (see FIG. 1), or another suitable device. As shown in FIG. 6B, the X-ray device 174 of the X-ray imaging system 80 is in the form of a portable handheld device 178*a*. Alternatively, the X-ray device 174 and the X-ray imaging system 80 may be coupled to, and positioned at, the end 108 of a robot arm 110 of a robotic system 106, as shown in FIG. 5, or may be positioned on the movable base 116 of the mobile system 114, where the movable base 116 is coupled to, and moves along, the track assembly 118, as shown in FIG. 4.

As shown in FIG. 6B, the installed one-sided fastener 16*a*, such as the bolt 16*b*, is installed in the structure 18, such as the workpiece 50, for example, the aircraft structure 58, comprising two structure portions 18*a* that form the joined structure 18*b* with the joint 152. The installed one-sided fastener 16*a* is installed in the opening 46, such as the through opening 46*a*, formed through the structure 18, such as through the two structure portions 18*a*. As shown in FIG. 6B, the installed one-sided fastener 16*a*, such as the bolt 16*b*, has the first end 20 comprising the break-off end 20*b*, at the first side 40, such as the exterior side 40*a*, of the structure 18. FIG. 6B further shows the installed one-sided fastener 16*a* with the second end 22, or tail end 22*a*, and the fastener body 24, such as the shaft body 24*a*. FIG. 6B further shows the core fastener portion 138 having the shank 140 and the threaded portion 142 with threads 144.

FIG. 6B further shows the sleeve 145 compressed against the second side 42, or interior side 42*a*, of the structure 18, and surrounding the portion 24*b* of the fastener body 24, surrounding the portion 140*a* of the shank 140, and surrounding the first portion 142*a* of the threaded portion 142. FIG. 6B shows the fastener bulb 30 adjacent the second side 42 of the structure 18. FIG. 6B further shows the length 158 of the installed one-sided fastener 16*a*, the grip length 38 of the installed one-sided fastener 16*a*, and the length 36 of the pin protrusion 34 of the installed one-sided fastener 16*a*.

Figure 7:
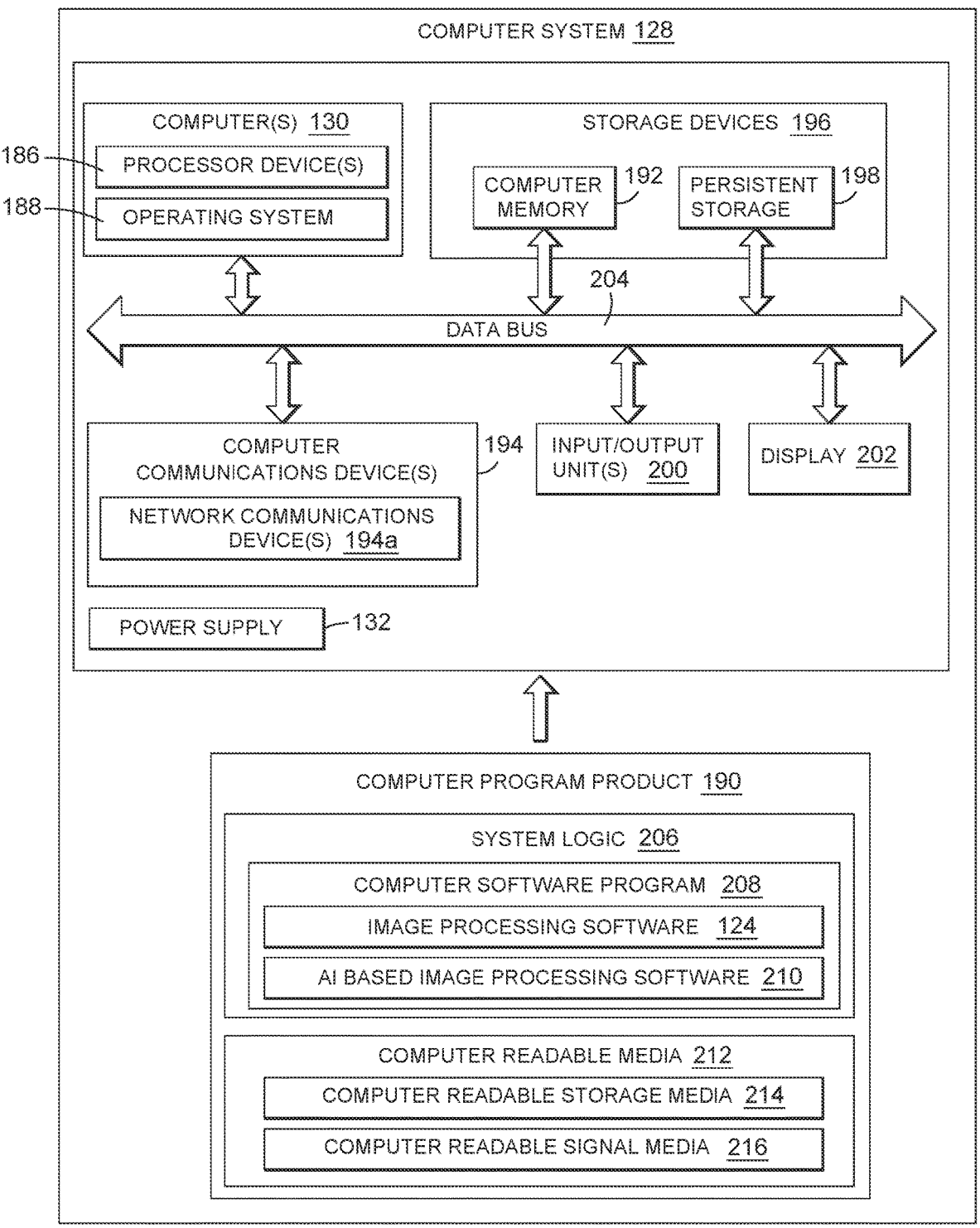
FIG. 7 is an illustration of a block diagram of an exemplary version of a computer system that may be used with a version of a system and a method of the disclosure.

Now referring to FIG. 7, FIG. 7 is an illustration of a block diagram of an exemplary version of the computer system 128 that may be used with the system 10 (see FIG. 1), and the method 250 (see FIG. 8A), and the method 280 (see FIG. 8B), of the disclosure. As shown in FIG. 7, the computer system 128 comprises one or more computers 130 with one or more processor devices 186, and an operating system 188. The computer system 128 (see FIG. 7) may be used to implement the one or more computers 130 (see FIG. 7).

The one or more computers 130 (see FIG. 7) or one or more processor devices 186 (see FIG. 7) may be configured to control one or more functions of one or more elements of the system 10 (see FIG. 1) through computer program instructions, such as a computer program product 190 (see FIG. 7) stored on a computer memory 192 (see FIG. 7), accessible to the one or more computers 130 (see FIG. 7), or one or more processor devices 186 (see FIG. 7).

As shown in FIG. 7, the computer system 128 may further comprise one or more computer communications devices 194, such as networking communications devices 194a, for linking the system 10 (see FIG. 1), for example, to one or more separate systems. The networking communications devices 194a (see FIG. 7) may comprise network links between various computers and devices connected together within a network data processing system via wire connections, wireless communication links, fiber optic cables, or other suitable network connections, and that may connect to a network, a server, the Internet, or another system or device.

The one or more computer communications devices 194 (see FIG. 7) may be configured to provide for communications in accordance with any of a number of wired or wireless communication standards. The one or more computers 130 (see FIG. 7) or one or more processor devices 186 (see FIG. 7) may also be configured to facilitate communications via the one or more computer communications devices 194 (see FIG. 7) by, for example, controlling hardware included within the one or more computer communications devices 194 (see FIG. 7). The one or more computer communications devices 194 (see FIG. 7) may include, for example, one or more antennas, a transmitter, a receiver, a transceiver and/or supporting hardware, including, for example, a processor for enabling communications.

As shown in FIG. 7, the computer system 128 further comprises storage devices 196, such as computer memory 192 and persistent storage 198. The computer memory 192 (see FIG. 7) may comprise one or more of a random access memory (RAM), including dynamic and/or static RAM, on-chip or off-chip cache memory, or other suitable computer memory. The persistent storage 198 (see FIG. 7) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage.

As shown in FIG. 7, the computer system 128 further comprises one or more input/output units 200, a display 202, a data bus 204, and a power supply 132. The one or more input/output units 200 (see FIG. 7) provide for the input and output of data with other devices connected to the computer system 128 (see FIG. 7), such as, the computer interfaces. The one or more input/output units 200 (see FIG. 7) may comprise such devices as a keyboard, a mouse, a joystick, or other input/output devices. For example, the one or more input/output units 200 (see FIG. 7) may provide a connection for user input though a keyboard and mouse, or may send output to a printer or other device.

The display 202 (see FIG. 7) provides the means to display the image data 98 (see FIG. 1), or other data or information to a user, an analyst, one or more separate automated systems, automated computer programs, automated apparatuses, or automated devices, or another suitable separate system, program, or device. As shown in FIG. 7, the data bus 204 provides communications between the one or more computers 130, the computer memory 192, the persistent storage 198, the computer communications devices 194, the one or more input/output units 200, and the display 202. The power supply 132 (see FIG. 7) of the computer system 128 (see FIG. 7) may comprise batteries, electricity, solar chargers, or other power supply elements.

As shown in FIG. 7, the computer program product 190 is preferably used in the computer system 128. The computer program product 190 (see FIG. 7) comprises a system logic 206 (see FIG. 7). As shown in FIG. 7, the system logic 206 may comprise a computer software program 208, such as the image processing software 124, or an artificial intelligence (AI) based image processing software 210. The system logic 206 may further comprise an algorithm, program code, computer firmware, or another suitable system logic. As shown in FIG. 7, the computer program product 190 may comprise a computer readable medium 212. The computer readable medium 212 (see FIG. 7) may comprise computer readable storage media 214 (see FIG. 7), computer readable signal media 216 (see FIG. 7), or another suitable computer readable medium.

The system logic 206 (see FIG. 7) may be stored in and retrieved from the computer readable storage media 214 (see FIG. 7) and loaded into the one or more computers 130 (see FIG. 7), the one or more processor devices 186, or other programmable device, to configure and direct the one or more computers 130, the one or more processor devices 186, or other programmable device to execute operations to be performed on or by the one or more computers 130, the one or more processor devices 186, or other programmable device, and to function in a particular way. Execution of the system logic 206 (see FIG. 7) may produce a computer-implemented system, process or method, such that the system logic 206 executed by the one or more computers 130 (see FIG. 7), one or more processor devices 186 (see FIG. 7), or other programmable device provide operations for implementing the functions disclosed herein.

Figure 8A:
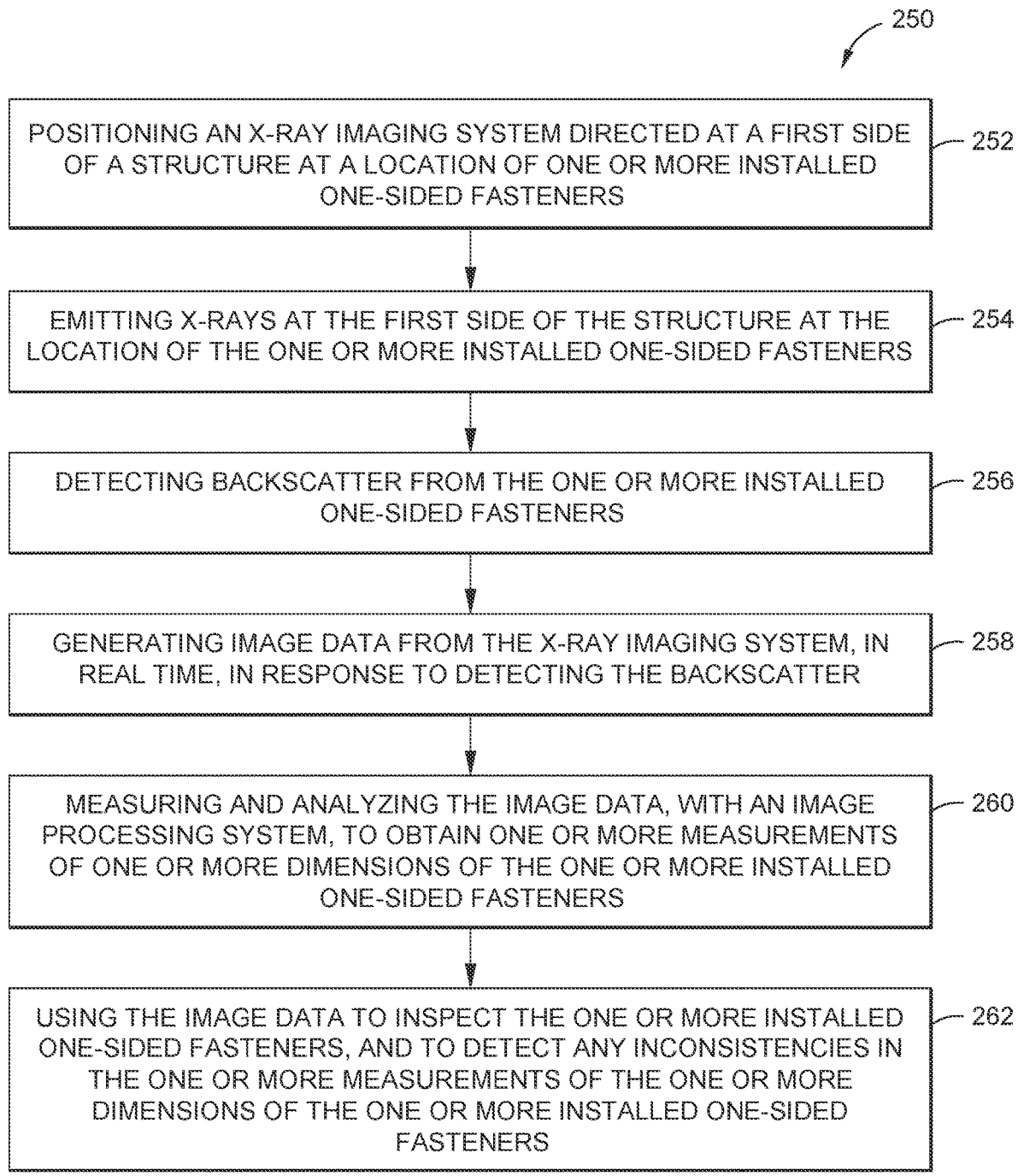
FIG. 8A is an illustration of a flow diagram of an exemplary version of a method of the disclosure.

Now referring to FIG. 8A, FIG. 8A is an illustration of a flow diagram of an exemplary version of a method 250 of the disclosure. In another version of the disclosure, there is provided the method 250 for inspecting 12 (see FIG. 1) and measuring 14 (see FIG. 1) one or more installed one-sided fasteners 16a (see FIGS. 1, 2A-2B) in a structure 18 (see FIG. 1).

The blocks in FIG. 8A represent operations and/or portions thereof, or elements, and lines connecting the various blocks do not imply any particular order or dependency of the operations or portions thereof, or elements. FIG. 8A and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 8A, the method 250 comprises the step 252 of positioning an X-ray imaging system 80 (see FIGS. 1, 4, 5) directed at a first side 40 (see FIGS. 1, 4, 5) of the structure 18 (see FIGS. 1, 4, 5) at a location 48 (see FIGS. 1, 4, 5) of the one or more installed one-sided fasteners 16a (see FIGS. 1, 4, 5) installed through one or more openings 46 (see FIGS. 1, 4, 5) in the structure 18. The one or more installed one-sided fasteners 16a each has a fastener body 24 (see FIGS. 2A-2B) protruding from a second side 42 (see FIG. 2B) of the structure 18 (see FIG. 2B).

The step 252 of positioning the X-ray imaging system 80 further comprises, positioning the X-ray imaging system 80 facing the first side 40 of the structure 18 comprising one of, as shown in FIG. 1, a workpiece 50, a coupon 52, an aircraft structure 58, an aircraft part 60, a spacecraft structure 62, a rotorcraft structure 64, a watercraft structure 66, an automobile structure 68, a train structure 70, an architectural structure 72, or another suitable structure.

The step 252 of positioning the X-ray imaging system 80 may further comprise, positioning the X-ray imaging system 80 comprising a backscatter X-ray imaging system 80a (see FIGS. 1, 4).

The step 252 of positioning the X-ray imaging system 80 may further comprise, in one version, as shown in FIG. 5, positioning the X-ray imaging system 80 at an end 108 of a robot arm 110 of a robotic system 106, so that the X-ray imaging system 80 acts as an end effector 112. The step 252 of positioning the X-ray imaging system 80 may further comprise, in another version, as shown in FIG. 4, positioning the X-ray imaging system 80 on a movable base 116 of a mobile system 114, where the movable base 116 is coupled to, and moves along, a track assembly 118.

The step 252 of positioning the X-ray imaging system 80 may further comprise, in one version, as shown in FIG. 6A, positioning an X-ray device 174 of the X-ray imaging system 80 in a parallel position 176 parallel to, and directly opposite, the one or more installed one-sided fasteners 16a, to measure a diameter 32 of a fastener bulb 30 of the one or more installed one-sided fasteners 16a. In another version, the X-ray device 174 of the X-ray imaging system 80 may be positioned in the parallel position 176 parallel to, and directly opposite, the one or more installed one-sided fasteners 16a, to measure a length 36 of a pin protrusion 34 of the one or more installed one-sided fasteners 16a, and/or a grip length 38 of the one or more installed one-sided fasteners 16a. The step 252 of positioning the X-ray imaging system 80 may further comprise, in another version, as shown in FIG. 6B, positioning the X-ray device 174 of the X-ray imaging system 80 at an angled position 180 directed at the one or more installed one-sided fasteners 16a, to measure the length 36 of the pin protrusion 34 of the one or more installed one-sided fasteners 16a, and/or the grip length 38 of the one or more installed one-sided fasteners 16a. In another version, the X-ray device 174 of the X-ray imaging system 80 is positioned in the angled position 180 directed at the one or more installed one-sided fasteners 16a to measure the diameter 32 of the fastener bulb 30 of the one or more installed one-sided fasteners 16a.

As shown in FIG. 8A, the method 250 further comprises the step 254 of emitting X-rays 82 (see FIGS. 1, 4) at the first side 40 of the structure 18 at the location 48 of the one or more installed one-sided fasteners 16a. As shown in FIG. 8A, the method 250 further comprises the step 256 of detecting backscatter 84 (see FIGS. 1, 4) from the one or more installed one-sided fasteners 16a.

As shown in FIG. 8A, the method 250 further comprises the step 258 of generating image data 98 (see FIG. 1) from the X-ray imaging system 80, in real time, in response to detecting the backscatter 84. The image data 98 comprises one or more images 100 (see FIG. 1) of the fastener body 24 (see FIGS. 1, 6A-6B) of the one or more installed one-sided fasteners 16a.

As shown in FIG. 8A, the method 250 further comprises the step 260 of measuring 14 (see FIG. 1) and analyzing 15 (see FIG. 1) the image data 98, with an image processing system 120 (see FIG. 1), to obtain one or more measurements 26 (see FIG. 1) of one or more dimensions 28 (see FIG. 1) of the one or more installed one-sided fasteners 16a. The step 260 of measuring 14 and analyzing 15 the image data 98 with the image processing system 120 may further comprise, measuring 14 and analyzing 15 the image data 98 with the image processing system 120 comprising one of, an image processing software 124 (see FIG. 1), an artificial intelligence neural network 126 (see FIG. 1), or another suitable image processing system. The step 260 of measuring 14 and analyzing 15 the image data 98 may further comprise, measuring 14 and analyzing 15 the image data 98 to obtain the one or more measurements 26 of one or more dimensions 28 comprising one or more of, the diameter 32 (see FIG. 1) of the fastener bulb 30 (see FIG. 1) of the one or more installed one-sided fasteners 16a, the length 36 (see FIG. 1) of the pin protrusion 34 (see FIG. 1) of the one or more installed one-sided fasteners 16a, and the grip length 38 (see FIG. 1) of the one or more installed one-sided fasteners 16a.

As shown in FIG. 8A, the method 250 further comprises the step 262 of using the image data 98 to inspect the one or more installed one-sided fasteners 16a, and to detect any inconsistencies 122 (see FIG. 1), such as out-of-specification parameters 122a (see FIG. 1), in the one or more measurements 26 of the one or more dimensions 28 of the one or more installed one-sided fasteners 16a. The step 262 of using the image data 98 to inspect the one or more installed one-sided fasteners 16a may further comprise, using the image data 98 to provide a confined space entry work reduction 134 (see FIG. 1), by allowing for nondestructive inspection 88 (see FIG. 1) of the one or more installed one-sided fasteners 16a. Thus, performance of confined space entry work by an operator, a worker, a mechanic, an inspector, a robot, or another user or automated apparatus, to measure and inspect the one or more installed one-sided fasteners 16a is reduced or minimized with the method 250.

Figure 8B:
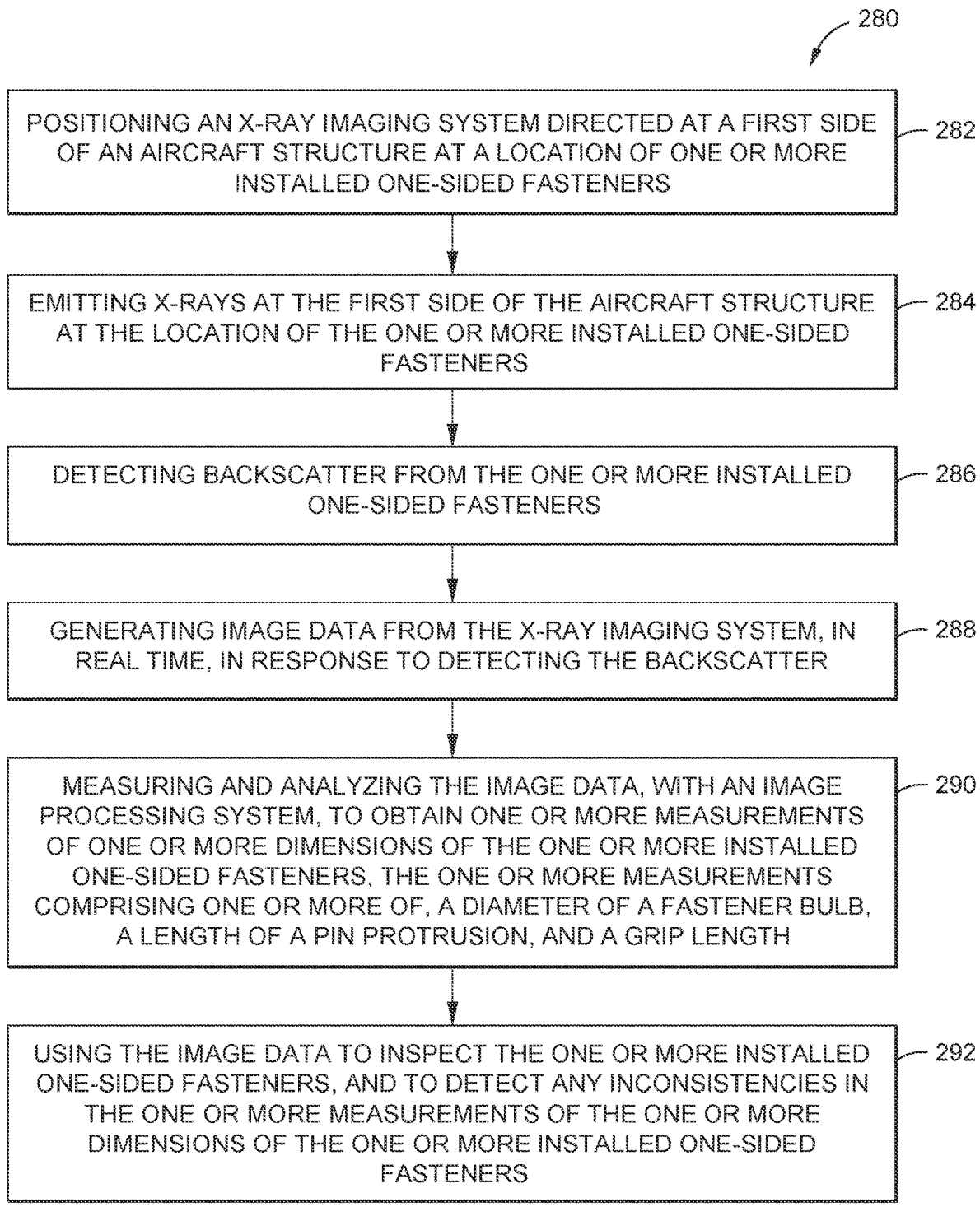
FIG. 8B is an illustration of a flow diagram of another exemplary version of a method of the disclosure.

Now referring to FIG. 8B, FIG. 8B is an illustration of a flow diagram of an exemplary version of a method 280 of the disclosure. In another version of the disclosure, there is provided the method 280 for inspecting 12 (see FIG. 1) and measuring 14 (see FIG. 1) one or more installed one-sided fasteners 16a in an aircraft structure 58 (see FIGS. 1, 9) for an aircraft 56 (see FIGS. 1, 9).

The blocks in FIG. 8B represent operations and/or portions thereof, or elements, and lines connecting the various blocks do not imply any particular order or dependency of the operations or portions thereof, or elements. FIG. 8B and the disclosure of the steps of the method 280 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 8B, the method 280 comprises the step 282 of positioning the X-ray imaging system 80 (see FIGS. 1, 5) directed at the first side 40 (see FIGS. 1, 5) of the aircraft structure 58 (see FIGS. 1, 5) at a location 48 (see FIGS. 1, 5) of the one or more installed one-sided fasteners 16a (see FIGS. 1, 5) installed through one or more openings 46 (see FIGS. 1, 5) in the aircraft structure 58. The one or more installed one-sided fasteners 16a each has the fastener body 24 (see FIGS. 1, 2A) protruding from the second side 42 (see FIGS. 1, 5) of the aircraft structure 58.

The step 282 of positioning the X-ray imaging system 80 may further comprise, in one version, as shown in FIG. 6A, positioning the X-ray device 174 of the X-ray imaging system 80 in a parallel position 176 parallel to, and directly opposite, the one or more installed one-sided fasteners 16a, to measure the diameter 32 of the fastener bulb 30 of the one or more installed one-sided fasteners 16a. Alternatively, the diameter 32 of the fastener bulb 30 of the one or more installed one-sided fasteners 16a may be measured by positioning the X-ray device 174 of the X-ray imaging system 80 at an angled position 180 directed at the one or more installed one-sided fasteners 16a. The step 282 of positioning the X-ray imaging system 80 may further comprise, in another version, as shown in FIG. 6B, positioning the X-ray device 174 of the X-ray imaging system 80 at the angled position 180 directed at the one or more installed one-sided fasteners 16a, to measure one or more of, the length 36 of the pin protrusion 34 of the one or more installed one-sided fasteners 16a, and the grip length 38 of the one or more installed one-sided fasteners 16a. Alternatively, the length 36 of the pin protrusion 34 of the one or more installed one-sided fasteners 16a, and/or the grip length 38 of the one or more installed one-sided fasteners 16a, may be measured by positioning the X-ray device 174 of the X-ray imaging system 80 in the parallel position 176 parallel to, and directly opposite, the one or more installed one-sided fasteners 16a.

The step 282 of positioning the X-ray imaging system 80 may further comprise, positioning the X-ray imaging system 80 comprising the backscatter X-ray imaging system 80a (see FIG. 1). The step 282 of positioning the X-ray imaging system 80 may further comprise, in one version, as shown in FIG. 5, positioning the X-ray imaging system 80 at the end 108 of the robot arm 110 of the robotic system 106. The step 252 of positioning the X-ray imaging system 80 may further comprise, in another version, as shown in FIG. 4, positioning the X-ray imaging system 80 on the movable base 116 of the mobile system 114, where the movable base 116 is coupled to, and moves along, the track assembly 118.

As shown in FIG. 8B, the method 280 further comprises the step 284 of emitting X-rays 82 at the first side 40 of the aircraft structure 58 at the location 48 of the one or more installed one-sided fasteners 16a. As shown in FIG. 8B, the method 280 further comprises the step 286 of detecting backscatter 84 (see FIGS. 1, 4) from the one or more installed one-sided fasteners 16a.

As shown in FIG. 8B, the method 280 further comprises the step 288 of generating image data 98 (see FIG. 1) from the X-ray imaging system 80, in real time, in response to detecting the backscatter 84. The image data 98 comprises one or more images 100 (see FIG. 1) of the fastener body 24 of the one or more installed one-sided fasteners 16a.

As shown in FIG. 8B, the method 280 further comprises the step 290 of measuring 14 (see FIG. 1) and analyzing 15 (see FIG. 1) the image data 98, with an image processing system 120 (see FIG. 1), to obtain one or more measurements 26 (see FIG. 1) of one or more dimensions 28 (see FIG. 1) of the one or more installed one-sided fasteners 16a. The one or more measurements 26 comprise one or more of, the diameter 32 (see FIG. 1) of the fastener bulb 30 (see FIG. 1) of the one or more installed one-sided fasteners 16a, the length 36 of the pin protrusion 34 (see FIG. 1) of the one or more installed one-sided fasteners 16a, and the grip length 38 (see FIG. 1) of the one or more installed one-sided fasteners 16a.

As shown in FIG. 8B, the method 280 further comprises the step 292 of using the image data 98 to inspect the one or more installed one-sided fasteners 16a, and to detect any inconsistencies 122 (see FIG. 1), such as any out-of-specification parameters 122a (see FIG. 1), in the one or more measurements 26 of the one or more dimensions 28 of the one or more installed one-sided fasteners 16a. The step 292 of using the image data 98 to inspect the one or more installed one-sided fasteners 16a may further comprise, using the image data 98 to provide the confined space entry work reduction 134 (see FIG. 1), by allowing for the nondestructive inspection 88 (see FIG. 1) of the one or more installed one-sided fasteners 16a. Thus, performance of confined space entry work by an operator, a worker, a mechanic, an inspector, a robot, or another user or automated apparatus, to measure and inspect the one or more installed one-sided fasteners 16a is reduced or minimized with the method 280.

Figure 9:
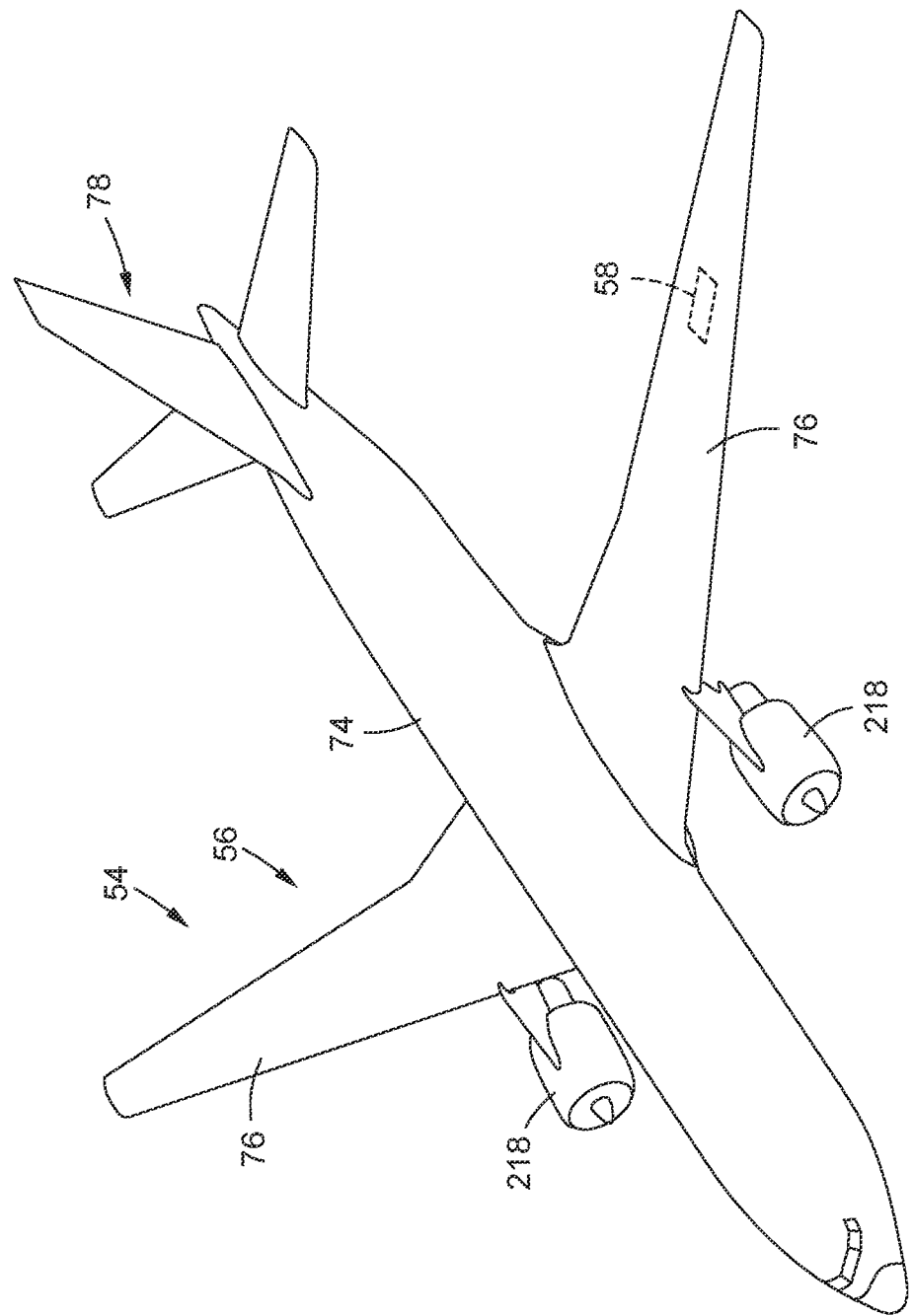
FIG. 9 is an illustration of a perspective view of an aircraft that incorporates aircraft structures having installed one-sided fasteners that may be inspected with a system and a method of the disclosure.

Now referring to FIG. 9, FIG. 9 is an illustration of a perspective view of a vehicle 54, such as an aircraft 56, that may incorporate one or more aircraft structures 58, and aircraft parts 60 (see FIG. 1), having one-sided fasteners 16 (see FIGS. 1, 2A) that may be inspected with the system 10 (see FIG. 1) and the method 250 (see FIG. 8A) or the method 280 (see FIG. 8B) of the disclosure. As shown in FIG. 9, the aircraft 56 comprises the fuselage 74, wings 76, tail 78, and engines 218. The one or more aircraft structures 58 may comprise composite structures, such as carbon fiber reinforced plastic (CFRP) structures or another type of composite structure, may comprise metal structures, such as aluminum, steel, or another type of metal structure, or may comprise a combination of composite and metal structures.

Although the aircraft 56 shown in FIG. 9 is generally representative of a commercial passenger aircraft having one or more aircraft structures 58, the teachings of the disclosed versions may be applied to other passenger aircraft. For example, the teachings of the disclosed versions may be applied to cargo aircraft, military aircraft, rotorcraft, and other types of aircraft or aerial vehicles, as well as aerospace vehicles, spacecraft, satellites, space launch vehicles, rockets, and other aerospace vehicles. Further, the teachings of the disclosed versions may be applied to watercraft, automobiles, trains, or architectural structures 72 (see FIG. 1).

Figure 10:
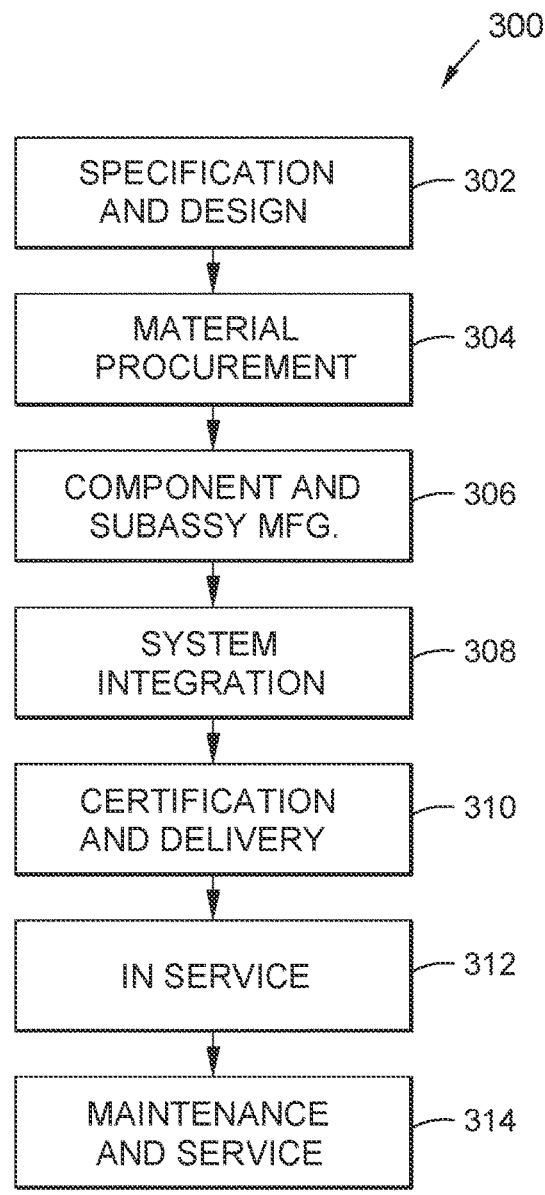
FIG. 10 is an illustration of a flow diagram of an exemplary aircraft manufacturing and service method.
Figure 11:
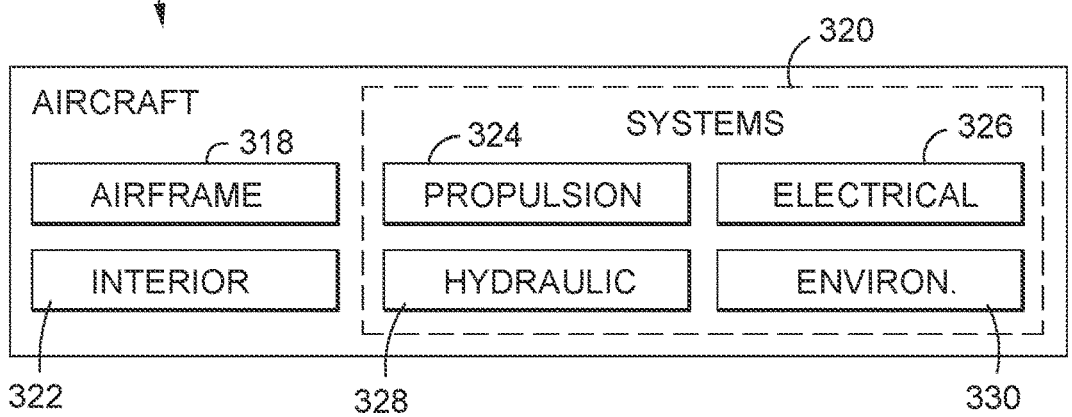
FIG. 11 is an illustration of an exemplary block diagram of an aircraft.

Now referring to FIGS. 10 and 11, FIG. 10 is an illustration of a flow diagram of an exemplary aircraft manufacturing and service method 300, and FIG. 11 is an illustration of an exemplary block diagram of an aircraft 316. Referring to FIGS. 10 and 11, versions of the disclosure may be described in the context of the aircraft manufacturing and service method 300 as shown in FIG. 10, and the aircraft 316 as shown in FIG. 11.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 11, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the system 10 (see FIG. 1), the method 250 (see FIG. 8A), and the method 280 (see FIG. 8B) provide an improved system and method for inspecting 12 (see FIG. 1) and measuring 14 (see FIG. 1) installed one-sided fasteners 16a (see FIGS. 1, 2B) from the first side 40 (see FIGS. 1, 2B), such as the exterior side 40a (see FIGS. 1, 2B), of a structure 18 (see FIGS. 1, 2B), that do not require the use of a borescope, a camera probe, or a vision system to insert into an adjacent fastener hole to inspect or measure the installed one-sided fasteners 16a, that reduce or eliminate confined space entry work to inspect and measure installed one-sided fasteners 16a, thus resulting in a confined space entry work reduction 134 (see FIG. 1), and that save time, labor, and costs in inspection and measurement of installed one-sided fasteners 16a installed in a structure 18, as compared to known systems and methods.

In addition, disclosed versions of the system 10 (see FIG. 1), the method 250 (see FIG. 8A), and the method 280 (see FIG. 8B) provide a nondestructive inspection 88 (see FIG. 1) to measure the diameter 32 (see FIG. 1) of the fastener bulb 30 (see FIG. 1) of the installed one-sided fasteners 16a, to measure the length 36 (see FIG. 1) of the pin protrusion 34 (see FIG. 1) of the installed one-sided fasteners 16a, and to measure the grip length 38 (see FIG. 1) of the installed one-sided fasteners 16a. The system 10, method 250, and method 280 disclosed herein solve the inspection of installed one-sided fasteners 16a through one-sided examination of the installation area of the installed one-sided fasteners 16a. The system 10, method 250, and method 280 disclosed herein also provide a full verification method that reduces or eliminates the need for an operator, a worker, a mechanic, an inspector, a robot, or another user or automated apparatus, to maneuver within a confined space and measure the installed one-sided fasteners 16a, such as the diameter 32 of the fastener bulb 30, the length 36 of the pin protrusion 34, and the grip length 38. Further, the system 10 (see FIG. 1), the method 250 (see FIG. 8A), and the method 280 (see FIG. 8B) provide for using an X-ray imaging system 80 (see FIG. 1) to measure the backscatter 84 (see FIG. 1), such as radiation, that is reflected from the target, such as the installed one-sided fasteners 16a. The X-rays 82 (see FIG. 1) are backscattered off the installed one-sided fasteners 16a to capture one or more images 100 (see FIG. 1) of the fastener bulb 30 on the interior side 42a (see FIG. 1) of the structure 18.

As shown in FIG. 5, the X-ray imaging system 80, in one version, is coupled to the end 108 of a robot arm 110 of a robotic system 106, and is positioned at the first side 40, such as the exterior side 40a, of the structure 18. As shown in FIG. 4, the X-ray imaging system 80, in another version, is coupled to a movable base 116 of a mobile system 114, and the movable base 116 is coupled to a track assembly 118. As shown in FIG. 6A, in another version, the X-ray imaging system 80 is a portable handheld device 178. The X-ray imaging system 80 emits X-rays 82 (see FIG. 1) directed to the first side 40, such as the exterior side 40a, of the structure 18, which are backscattered off the installed one-sided fasteners 16a, to capture one or more images 100 of the fastener bulb 30 installed on the interior side 42a of the structure 18. The X-ray imaging system 80 measures the diameter 32 (see FIG. 1) of the fastener bulb 30 of the installed one-sided fasteners 16a, and conducts analysis through the artificial intelligence (AI) neural network 126 (see FIG. 1) or through the image processing software 124 (see FIG. 1), to determine if the diameter 32 of the fastener bulb 30 meets installation requirements and is in specification.

Moreover, disclosed versions of the system 10 (see FIG. 1), the method 250 (see FIG. 8A), and the method 280 (see FIG. 8B) provide potential applications where less destructive examination is required, and can operate even if only one side of the target, such as the installed one-sided fasteners 16a, is available for examination. The image processing system 120 (see FIG. 1) uses image processing software 124 and/or the artificial intelligence (AI) neural network 126 to process the one or more images 100 (see FIG. 1) and to measure the diameter 32 (see FIG. 1) of the fastener bulb 30 (see FIG. 1) of the installed one-sided fasteners 16a, to measure the length 36 (see FIG. 1) of the pin protrusion 34 (see FIG. 1) of the installed one-sided fasteners 16a, and to measure the grip length 38 (see FIG. 1) of the installed one-sided fasteners 16a. The post image processing has artificial intelligence capabilities to identify an installed one-sided fastener 16a, to measure the diameter 32 of the fastener bulb 30, and the length 36 of the pin protrusion 34, and to provide an accept or reject for a technician verification. Further, disclosed versions of the system 10 (see FIG. 1), the method 250 (see FIG. 8A), and the method 280 (see FIG. 8B) may be used to measure parts, such as aircraft parts 60 (see FIG. 1), and may be used to measure locations of parts in relation to each other, and all capable through post image processing.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A method for inspecting and measuring one or more installed one-sided fasteners in a structure, the method comprising the steps of:
  positioning an X-ray imaging system directed at a first side of the structure at a location of the one or more installed one-sided fasteners installed through one or more openings in the structure, the one or more installed one-sided fasteners each having a fastener body protruding from a second side of the structure;

emitting X-rays at the first side of the structure at the location of the one or more installed one-sided fasteners;

detecting backscatter from the one or more installed one-sided fasteners;

generating image data from the X-ray imaging system, in real time, in response to detecting the backscatter, the image data comprising one or more images of the fastener body of the one or more installed one-sided fasteners;

measuring and analyzing the image data, with an image processing system, to obtain one or more measurements of one or more dimensions of the one or more installed one-sided fasteners, the one or more measurements comprising one or more of:
   a diameter of a fastener bulb of the one or more installed one-sided fasteners, wherein the fastener bulb is formed against an interior side of the structure when the fastener is installed in the structure;
   a length of a pin protrusion of the one or more installed one-sided fasteners; and
   a grip length of the one or more installed one-sided fasteners; and using the image data to inspect the one or more installed one-sided fasteners, and to detect any out-of-specification parameters of the one or more measurements of the one or more dimensions of the one or more installed one-sided fasteners.

2. The method of claim 1, wherein the step of positioning the X-ray imaging system further comprises, positioning the X-ray imaging system facing the first side of the structure comprising one of, a workpiece, a coupon, an aircraft structure, an aircraft part, a spacecraft structure, a rotorcraft structure, a watercraft structure, an automobile structure, a train structure, or an architectural structure.

3. The method of claim 1, wherein the step of positioning the X-ray imaging system further comprises, positioning the X-ray imaging system comprising a backscatter X-ray imaging system.

4. The method of claim 1, wherein the step of positioning the X-ray imaging system further comprises, positioning the X-ray imaging system at an end of a robot arm of a robotic system.

5. The method of claim 1, wherein the step of positioning the X-ray imaging system further comprises, positioning the X-ray imaging system on a movable base of a mobile system.

6. The method of claim 1, wherein the step of positioning the X-ray imaging system further comprises, positioning an X-ray device of the X-ray imaging system in a parallel position parallel to, and directly opposite, the one or more installed one-sided fasteners.

7. The method of claim 1, wherein the step of positioning the X-ray imaging system further comprises, positioning an X-ray device of the X-ray imaging system at an angled position directed at the one or more installed one-sided fasteners.

8. The method of claim 1, wherein the step of measuring and analyzing the image data with the image processing system further comprises, measuring and analyzing the image data with the image processing system comprising one of, an image processing software, or an artificial intelligence neural network.

9. The method of claim 1, wherein the step of measuring and analyzing the image data further comprises, measuring and analyzing the image data to obtain the diameter of the fastener bulb to detect any out-of-specification diameter, and to detect when the fastener bulb is not properly formed.

10. The method of claim 1, wherein the step of using the image data to inspect the one or more installed one-sided fasteners further comprises, using the image data to provide a confined space entry work reduction, by allowing for a nondestructive inspection of the one or more installed one-sided fasteners.

11. A method for inspecting and measuring one or more installed one-sided fasteners in an aircraft structure, the method comprising the steps of:
   positioning an X-ray imaging system directed at a first side of the aircraft structure at a location of the one or more installed one-sided fasteners installed through one or more openings in the aircraft structure, the one or more installed one-sided fasteners each having a fastener body protruding from a second side of the aircraft structure;
   emitting X-rays at the first side of the aircraft structure at the location of the one or more installed one-sided fasteners;
   detecting backscatter from the one or more installed one-sided fasteners;
   generating image data from the X-ray imaging system, in real time, in response to detecting the backscatter, the image data comprising one or more images of the fastener body of the one or more installed one-sided fasteners;
   measuring and analyzing the image data, with an image processing system, to obtain one or more measurements of one or more dimensions of the one or more installed one-sided fasteners, wherein the one or more measurements comprise one or more of:
      a diameter of a fastener bulb of the one or more installed one-sided fasteners, wherein the fastener bulb is formed against an interior side of the aircraft structure when the fastener is installed in the aircraft structure;
      a length of a pin protrusion of the one or more installed one-sided fasteners; and
      a grip length of the one or more installed one-sided fasteners; and
   using the image data to inspect the one or more installed one-sided fasteners, and to detect any out-of-specification parameters of the one or more measurements of the one or more dimensions of the one or more installed one-sided fasteners.

12. The method of claim 11, wherein the step of positioning the X-ray imaging system further comprises, positioning an X-ray device of the X-ray imaging system in a parallel position parallel to, and directly opposite, the one or more installed one-sided fasteners, to measure the diameter of the fastener bulb of the one or more installed one-sided fasteners.

13. The method of claim 11, wherein the step of positioning the X-ray imaging system further comprises, positioning an X-ray device of the X-ray imaging system at an angled position directed at the one or more installed one-sided fasteners, to measure one or more of, the length of the pin protrusion of the one or more installed one-sided fasteners, and the grip length of the one or more installed one-sided fasteners.

14. The method of claim 11, wherein the step of using the image data to inspect the one or more installed one-sided fasteners further comprises, using the image data to provide a confined space entry work reduction, by allowing for a nondestructive inspection of the one or more installed one-sided fasteners.

15. A system for inspecting and measuring one or more installed one-sided fasteners in a structure, the system comprising:
the structure having a first side and a second side;
the one or more installed one-sided fasteners installed through one or more openings in the structure, the one or more installed one-sided fasteners each having a fastener body protruding from the second side of the structure;
an X-ray imaging system configured to emit X-rays at the first side of the structure at a location of the one or more installed one-sided fasteners, and configured to detect backscatter from the one or more installed one-sided fasteners;
image data generated from the X-ray imaging system in response to detecting the backscatter, the image data comprising one or more images of the fastener body of the one or more installed one-sided fasteners; and
an image processing system to measure and analyze the image data, to obtain one or more measurements of one or more dimensions of the one or more installed one-sided fasteners, to inspect the one or more installed one-sided fasteners, and to detect any out-of-specification parameters of the one or more measurements of the one or more dimensions of the one or more installed one-sided fasteners, the one or more measurements comprising one or more of:
a diameter of a fastener bulb of the one or more installed one-sided fasteners, wherein the fastener bulb is formed against an interior side of the structure when the fastener is installed in the structure;
a length of a pin protrusion of the one or more installed one-sided fasteners; and
a grip length of the one or more installed one-sided fasteners.

16. The system of claim 15, wherein the structure comprises one of, a workpiece, a coupon, an aircraft structure, an aircraft part, a spacecraft structure, a rotorcraft structure, a watercraft structure, an automobile structure, a train structure, or an architectural structure.

17. The system of claim 15, wherein the X-ray imaging system is attached at an end of a robot arm of a robotic system.

18. The system of claim 15, wherein the X-ray imaging system is attached to a movable base of a mobile system.

19. The system of claim 15, wherein the image processing system comprises one of, an image processing software, or an artificial intelligence neural network.

20. The system of claim 15, wherein one of the out-of-specification parameters comprises an out-of-specification diameter of the fastener bulb, when the fastener bulb is not properly formed.

* * * * *